US008972703B2

(12) United States Patent
Frigo et al.

(10) Patent No.: US 8,972,703 B2
(45) Date of Patent: *Mar. 3, 2015

(54) MULTITHREADED PROCESSOR ARCHITECTURE WITH OPERATIONAL LATENCY HIDING

(75) Inventors: Matteo Frigo, Austin, TX (US); Ahmed Gheith, Round Rock, TX (US); Volker Strumpen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/180,724

(22) Filed: Jul. 12, 2011

(65) Prior Publication Data

US 2014/0075159 A1    Mar. 13, 2014

Related U.S. Application Data

(62) Division of application No. 11/101,601, filed on Apr. 7, 2005, now Pat. No. 8,230,423.

(51) Int. Cl.
*G06F 9/38* (2006.01)
*G06F 11/20* (2006.01)

(52) U.S. Cl.
CPC .............. *G06F 9/38* (2013.01); *G06F 11/2094* (2013.01)
USPC ....................................................... 712/220

(58) Field of Classification Search
CPC combination set(s) only.
See application file for complete search history.

(56) References Cited

U.S. PATENT DOCUMENTS

| 4,229,790 | A | 10/1980 | Gilliland et al. |
| 5,357,617 | A | 10/1994 | Davis et al. |
| 5,499,349 | A | 3/1996 | Nikhil et al. |
| 5,560,029 | A | 9/1996 | Papadopoulos et al. |
| 6,216,220 | B1 * | 4/2001 | Hwang .......................... 712/219 |
| 6,463,527 | B1 | 10/2002 | Vishkin |
| 7,398,518 | B2 * | 7/2008 | Dichter ........................... 717/127 |
| 7,496,735 | B2 * | 2/2009 | Yourst et al. .................. 712/218 |
| 7,603,543 | B2 * | 10/2009 | Dooley et al. ................. 712/229 |
| 2003/0158885 | A1 * | 8/2003 | Sager .............................. 709/108 |
| 2004/0064756 | A1 * | 4/2004 | Kadambi ......................... 714/17 |

OTHER PUBLICATIONS

M. Bastille. Something Old: The Gamma 60, The Computer that was Ahead of its Time. Honeywell Computer Journal, 5(3):99-105, 1971, United States.
Robert Blumoff & Charles Leiserson. Scheduling Multithreaded Computations by Work Stealing. 35th Symposium on Foundations of Comp. Sci., pp. 356-368, Santa Fe, NM, Nov. 1994.

(Continued)

*Primary Examiner* — Eric Coleman
(74) *Attorney, Agent, or Firm* — Garg Law Firm, PLLC; Rakesh Garg; William J. Stock

(57) ABSTRACT

A method and processor architecture for achieving a high level of concurrency and latency hiding in an "infinite-thread processor architecture" with a limited number of hardware threads is disclosed. A preferred embodiment defines "fork" and "join" instructions for spawning new context-switched threads. Context switching is used to hide the latency of both memory-access operations (i.e., loads and stores) and arithmetic/logical operations. When an operation executing in a thread incurs a latency having the potential to delay the instruction pipeline, the latency is hidden by performing a context switch to a different thread. When the result of the operation becomes available, a context switch back to that thread is performed to allow the thread to continue.

24 Claims, 14 Drawing Sheets

(56) References Cited

OTHER PUBLICATIONS

David Culler et al. TAM-A Compiler Controlled Threaded Abstratct Machine. J. of Parallel and Distrib. Computing, 18(3):347-370, Jul. 1993, USA.

Jack B. Dennis & Earl C. Van Horn. Programming Semantics for Multiprogrammed Computations. Communications of the ACM, 9(3):143-155, Mar. 1966, United States.

S.R. Kunkel & J.E. Smith, Optimal Pipelining in Supercomputers. In 13th Symposium on Computer Architecture, pp. 404-411. IEEE Computer Society Press, 1986.

J. Laudon et al., Arch. and Implmt. Tradeoffs . . . Multi-Context Procrs. In R. Iannucci, ed., Multithreaded Comp. Architecture, pp. 167-200. Kluwer Academic Pub., MA, 1994.

* cited by examiner

```
foo:    A;
        fork bar;    ↓ text
        B;
        join lr;
        C;
bar:    D;
        join lr;
```
Figure 1A
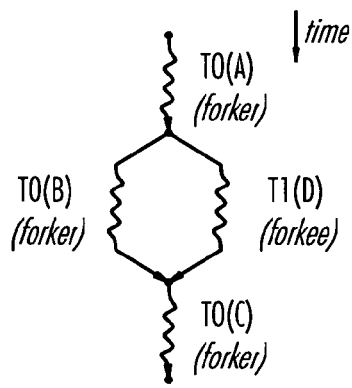
Figure 1B
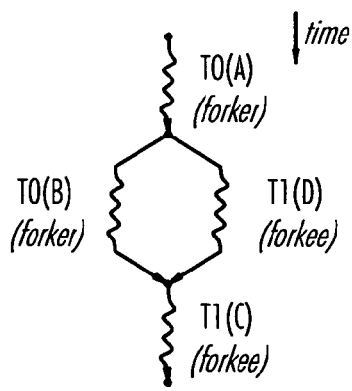
Figure 1C

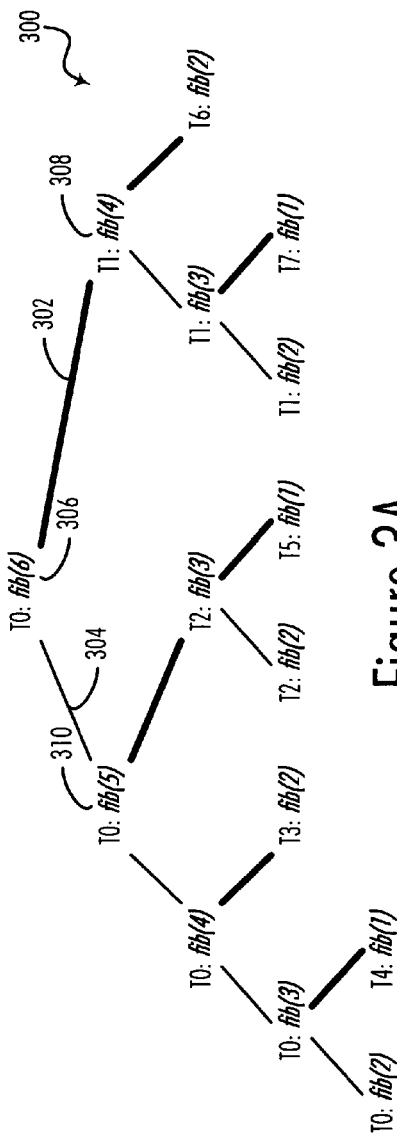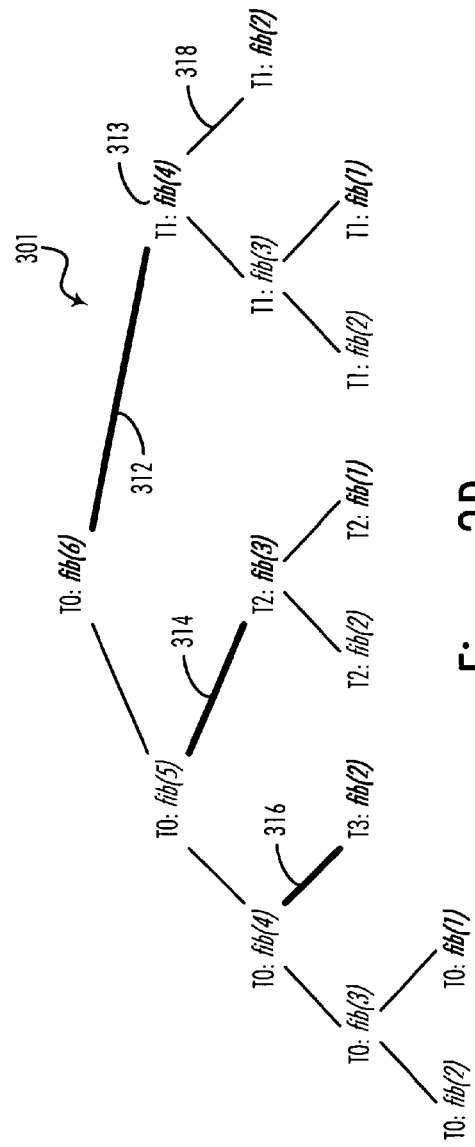
Figure 3A
Figure 3B

```
int c, i, n;

void foo(int j)
{
    /* do something */
    join c;
} void bar()
{
    c=n+1; /* initialize join counter */
    for(i=0; i<n; i++)
        fork foo(i);
    join c;
}
```

FIGURE 4

```
int i, n;

void foo(int j)
{
    /* do something */
    join;
} void bar()
{
    for(i=0; i<n; i++)
        fork foo(i);
    for(i=0; i<n; i++)
        join;
}
```

FIGURE 5

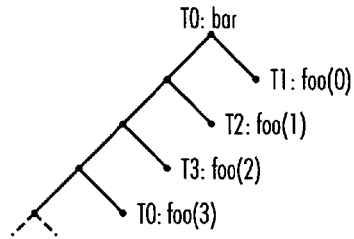
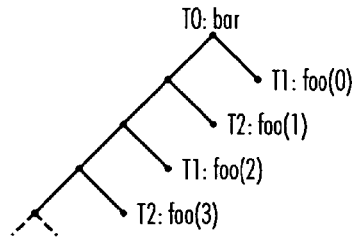
Figure 6A          Figure 6B
```
int n;
void bar(void)
{
    fork foo(0);
    join;
}
void foo(int j)
{
    if(j < n-1)
        fork foo(j+1);
    /* do something */
    join;
}
```
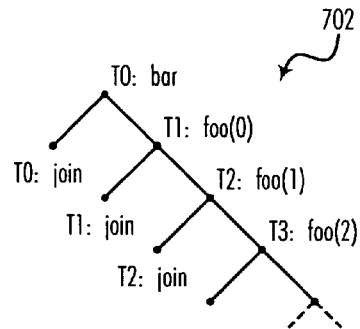
Figure 7

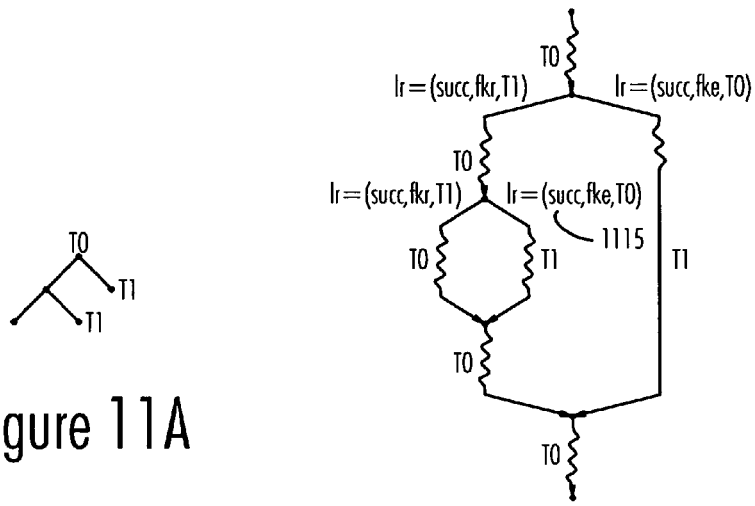
Figure 11A
Figure 11B
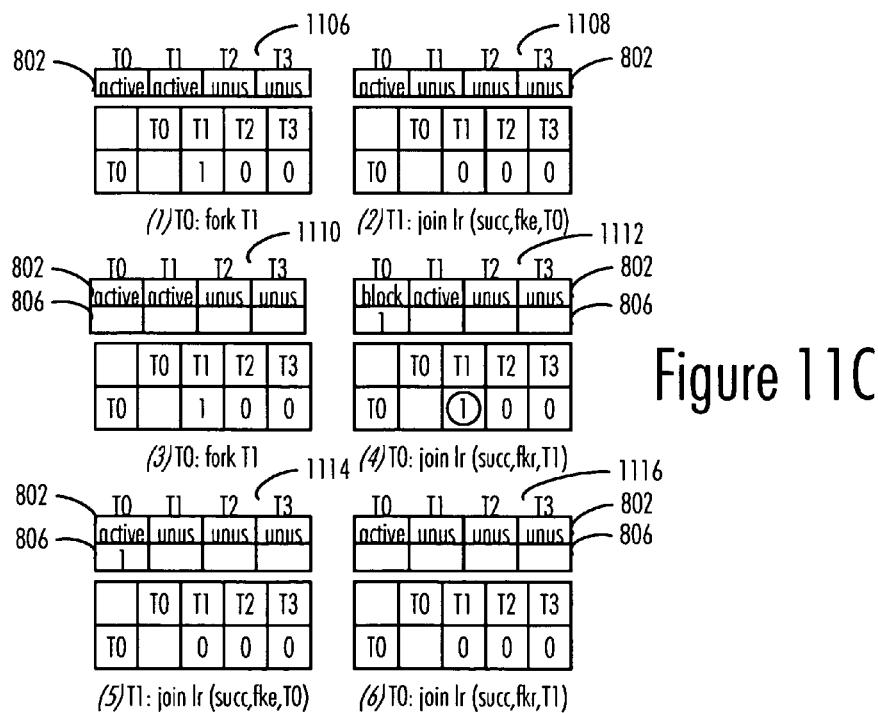
Figure 11C

MULTITHREADED PROCESSOR ARCHITECTURE WITH OPERATIONAL LATENCY HIDING

STATEMENT OF GOVERNMENT FUNDING

This invention was made with Government support under PERCS II, NBCH3039004. THE GOVERNMENT HAS CERTAIN RIGHTS IN THIS INVENTION.

CROSS-REFERENCE TO RELATED APPLICATION(S)

The present application is related to a U.S. patent application entitled "Multithreaded Processor Architecture with Implicit Granularity Adaptation," Ser. No. 11/101,608, which is filed Apr. 7, 2005, assigned to the same assignee, and incorporated herein by reference in its entirety. The present application is a DIVISIONAL APPLICATION of, and claims priority to, U.S. patent application entitled "Multithreaded Processor Architecture with Operational Latency Hiding," Ser. No. 11/101,610, which is filed Apr. 7, 2005 now U.S. Pat. No. 8,230,423, assigned to the same assignee.

BACKGROUND OF THE INVENTION

1. Technical Field

The present invention relates generally to advanced computer architectures. More specifically, the present invention provides a multithreaded processor architecture that aims at simplifying the programming of concurrent activities for memory latency hiding and multiprocessing without sacrificing performance.

2. Description of the Related Art

Multithreaded architectures (also referred to as multiple-context architectures) use hardware-supported concurrency to hide the latency associated with remote load and store operations. In this context, it is important to understand what is meant by "concurrency," as the term may be easily confused with "parallelism." In parallel execution, multiple instructions are executed simultaneously. In concurrent execution, multiple streams of instructions, referred to here as threads, are maintained simultaneously, but it is not necessary for multiple individual instructions to be executed simultaneously. To make an analogy, if multiple workers in an office are working simultaneously, one could say that the workers are working in parallel. On the other hand, a single worker may maintain multiple projects concurrently, in which the worker may switch between the different currently maintained projects, working a little on one, switching to another, then returning to the first one to pick up where he/she left off. As can be observed from this analogy, the term "concurrent" is broader in scope than "parallel." All parallel systems support concurrent execution, but the reverse is not true.

Another useful analogy comes from the judicial system. A single judge may have many cases pending in his or her court at any given time. However, the judge will only conduct a hearing on a single case at a time. Thus, the judge presides over multiple cases in a concurrent manner. A single judge will not hear multiple cases in parallel, however.

Multithreaded architectures provide hardware support for concurrency, but not necessarily for parallelism (although some multithreaded architectures do support parallel execution of threads). Supporting multiple concurrent threads of execution in a single processor makes memory latency hiding possible. The latency of an operation is the time delay between when the operation is initiated and when a result of the operation becomes available. Thus, in the case of a memory-read operation, the latency is the delay between the initiation of the read and the availability of the data. In certain circumstances, such as a cache miss, this latency can be substantial. Multithreading alleviates this problem by switching execution to a different thread if the current thread must wait for a reply from the memory module, thus attempting to keep the processor active at all times.

Returning to the previous office worker example, if our hypothetical office worker needs a piece of information from a co-worker who is not presently in the office, our office worker may decide to send the co-worker an e-mail message. Rather than sit idle by the computer to await a reply to the message (which would incur a performance or "productivity" penalty), the worker will generally switch to some other task to perform in the meantime, while waiting for the reply. This "hides" the latency, because the worker is still able to perform productive work on a continuous basis. Multithreaded architectures apply the same principle to memory latency hiding in processors.

In order to maintain multiple threads of execution, the current execution state, or context, of each thread must be maintained. Hence, the term "multithreaded architecture" is synonymous with the term "multiple context architecture." The act of switching between different threads is thus known as context switching. Returning to the previous judge analogy, context information is like a docket: it describes the current state of a thread so that execution can be resumed from that state, just as a judge's docket tells the judge about what motions are outstanding, so that the judge knows what rulings will need to be made when the case comes on for hearing. In the case of a computer program, it is the processor state (for example: program counter, registers, and status flags) that makes up the context for a given thread.

Multithreaded execution and context switching are commonly employed in software as part of a multitasking operating system, such as AIX (Advanced Interactive eXecutive), a product of International Business Machines Corporation of Armonk, N.Y. Software instructions are used create and destroy threads, as well as to periodically switch between different threads' contexts. Multithreaded processors, on the other hand, provide built-in hardware support for thread creation/deletion and context switching.

Gamma 60 was the first multithreaded system on record. Gamma 60 was designed and produced by Bull GmbH in Cologne (Köln) in the 1950's. Decades later, Burton Smith pioneered the use of multithreading for memory latency hiding in multiprocessors. He architected HEP in the late 1970's, later Horizon, and more recently Tera (described in U.S. Pat. No. 4,229,790 (GILLILAND et al.) 1980 Oct. 21). Threading models appeared in the late 80's, such as the Threaded Abstract Machine (TAM). Cilk, an algorithmic multithreaded programming language, appeared in the mid 90's.

A number of existing patents are directed to multithreaded architectures. U.S. Pat. No. 5,499,349 (NIKHIL et al.) 1996 Mar. 12 and U.S. Pat. No. 5,560,029 (PAPADOPOULOS et al.) 1996 Sep. 24, both assigned to Massachusetts Institute of Technology, describe multithreaded processor architectures that utilize a continuation queue and fork and join instructions to support multithreading. U.S. Pat. No. 5,357,617 (DAVIS et al.) 1994 Oct. 18, assigned to International Business Machines Corporation, is another example of an existing multithreaded architecture design.

Another related technology is SMT (simultaneous multi-threading, hyperthreading/Intel, etc.), which integrates multithreading with superscalar architecture/instruction-level parallelism (ILP). SMT, however, is very complex and powerconsuming. U.S. Pat. No. 6,463,527 (VISHKIN) 2002 Oct. 8 is an example of such a multithreaded processor with ILP.

Some multithreaded processors are able to hide the latency associated with performing memory operations, such as loads and stores. However, other operations, such as arithmetic operations, for example, still impose a substantial performance penalty due to the latencies of the different functional units used to perform those operations.

What is needed, therefore, is a method and system for hiding the latency of non-memory-access operations in a multithreaded processor pipeline. The present invention provides a solution to this and other problems, and offers other advantages over previous solutions.

SUMMARY OF THE INVENTION

The present invention provides a method and processor architecture for achieving a high level of concurrency and latency hiding in an "infinite-thread processor architecture" with a limited number of hardware threads. A preferred embodiment defines "fork" and "join" instructions for spawning new context-switched threads. Context switching is used to hide the latency of both memory-access operations (i.e., loads and stores) and arithmetic/logical operations. When an operation executing in a thread incurs a latency having the potential to delay the instruction pipeline, the latency is hidden by performing a context switch to a different thread. When the result of the operation becomes available, a context switch back to that thread is performed to allow the thread to continue.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein:

FIG. 1A is a diagram of a code fragment used to illustrate a thread model used in a preferred embodiment of the present invention;

FIGS. 1B and 1C are thread diagrams illustrating multi-threaded execution of the code fragment in FIG. 1A;

FIGS. 3A and 3B are fork/call tree diagrams illustrating a tree-recursive evaluation of a Fibonacci-number function in accordance with a preferred embodiment of the present invention;

FIG. 4 is a code fragment illustrative of a program in which the number of spawned threads is potentially unbounded;

FIG. 5 is a code fragment illustrative of a program according to a preferred embodiment of the present invention, in which a potentially unbounded number of software threads are mapped into a bounded number of hardware threads;

FIGS. 6A and 6B are fork/call tree diagrams illustrating two possible executions of the code fragment in FIG. 5 according to a preferred embodiment of the present invention;

FIG. 7 is a diagram illustrating a scenario in which threads are reused in accordance with a preferred embodiment of the present invention;

FIG. 11A is a fork/call tree diagram depicting a second illustrative execution scenario of a preferred embodiment of the present invention;

FIG. 11B is a thread fork/join diagram depicting the illustrative execution scenario described in FIG. 11A;

FIG. 11C is a diagram illustrating the sequence of states of a thread table in the illustrative execution scenario described in FIG. 11A;

DETAILED DESCRIPTION

Figures 2A, 2B:
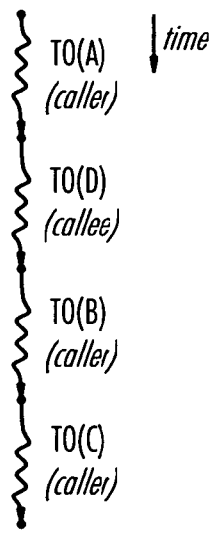
FIGS. 2A and 2B are diagrams illustrating single-threaded execution of the code fragment in FIG. 1A.

The following is intended to provide a detailed description of an example of the invention and should not be taken to be limiting of the invention itself. Rather, any number of variations may fall within the scope of the invention, which is defined in the claims following the description.

The present invention provides a multithreaded processor architecture that aims at simplifying the programming of concurrent activities for memory latency hiding and parallel processing without sacrificing performance. We assume that the programmer, potentially supported by a compiler, specifies concurrent activities in the program. We call each of the concurrent activities a thread.

To date, the primary focus in the design of high-performance parallel programs is thread granularity. We denote as granularity the number of instructions shepherded by a thread during execution. Coarse granularity typically implies relatively few parallel threads, which enjoy a relatively low bookkeeping overhead in both memory requirements and execution time. However, in particular for irregular applications, large grain sizes often cause relatively poor load balancing, and suffer from the associated performance hit. To the contrary, small grain sizes are usually associated with a large number of threads which can improve load balancing at the expense of larger bookkeeping overheads. Ideally, we can relieve the programmer from considering the intricate granularity trade-offs altogether. To that end, our processor architecture encourages the specification of as much parallelism as inherent in an application, rather than optimizing performance for a particular machine by tweaking thread granularity.

We tacitly assume that it is relatively easy for a program to create excess parallelism in form of threads. Research on mapping applications to dataflow architectures as well as on constructing dependency graphs in the compiler arena provide strong evidence for the validity of this assumption. Furthermore, we assume that programmed units of parallelism are encapsulated in functions. Careful design of a function requires choosing the minimal thread granularity to be coarse enough to amortize the function call overhead. As a side effect, we avoid the excessive space and time penalties of extremely fine-grained instruction-level parallelism. While functions are natural units of parallelism in most programming languages, some languages expose different opportunities, such as expressions in Scheme and other functional languages, or Horn clauses in a logic language, such as Prolog.

We distinguish between software threads and hardware threads in the sense that hardware threads require hardware structures for bookkeeping, while software threads are mapped into hardware threads to be executed within the context of a hardware thread. A preferred embodiment of the present invention incorporates the following features: (1) Multiple fine-grained software threads may be executed as coarse-grained hardware threads. (2) Since hardware threads require hardware structures for bookkeeping, the number of hardware threads is bounded so that fast circuits can be employed for implementing thread management operations. In addition, (3) software threads are mapped into hardware threads without penalizing the specification of excess parallelism, neither in space nor time. These three architectural features are a foundation for supporting portable parallel programs. A portable program specifies as much parallelism as available or desired and focuses on exposing the parallelism inherent in the problem, rather than on specializing the program to a particular parallel machine at hand in the name of performance optimization.

A preferred embodiment of the present invention tackles the problem of mapping a potentially large number of software threads automatically and efficiently into a limited number of hardware threads. This problem has been studied before in the context of the algorithmic multithreaded programming language Cilk (Robert D. Blumofe and Charles E. Leiserson. Scheduling Multithreaded Computations by Work Stealing. In 35$^{th}$ Annual Symposium on Foundations of Computer Science, pages 356-368, Santa Fe, N. Mex., November 1994). The mapping proposed as part of the Cilk language is a software solution. A preferred embodiment of the present invention provides a microarchitectural solution for a multithreaded processor that offers a different perspective and has several advantages in its own right: (1) thread creation and termination does not incur any performance penalty, (2) context switching comes for free, (3) granularity adaptation is implemented by degrading a fork into a function call with a performance penalty of just one stall cycle, (4) thread management is integrated with memory latency hiding in the thread scheduler.

The Thread Model

In the following, we discuss our thread model from the perspective of a multithreaded architecture. Examples of existing thread models may be found in Robert D. Blumofe and Charles E. Leiserson. Scheduling Multithreaded Computations by Work Stealing. In 35$^{th}$ Annual Symposium on Foundations of Computer Science, pages 356-368, Santa Fe, N. Mex., November 1994; David E. Culler, Seth C. Goldstein, Klaus E. Schauser, and Thorsten von Eicken. TAM-A Compiler Controlled Threaded Abstract Machine. *Journal of Parallel and Distributed Computing,* 18(3):347-370, July 1993; C. Anthony R. Hoare. *Communicating Sequential Processes.* Prentice Hall, Englewood Cliffs, United Kingdom, 1985. Our thread model introduces a new feature called fork degradation. We view a hardware thread as representing a hardware resource that shepherds the execution of a software thread. The most basic functionalities of a multithreaded architecture are instructions for creating and terminating software threads [Conway (Melvin E. Conway. A Multiprocessor System Design. In *Fall Joint Computer Conference,* pages 139-146. AFIPS, Spartan Books (vol 24), October 1963) introduced the fork and join pair of instructions, see also Jack B. Denns and Earl C. Van Horn. Programming Semantics for Multiprogrammed Computations. *Communication of the ACM,* 9(3): 143-155, March 1966. We use the same instruction names, although we use the instructions with the semantics of Dijkstra's structured cobegin and coend commands and Hoare's concurrency operator II (C. Anthony R. Hoare. *Communicating Sequential Processes.* Prentice Hall, Englewood Cliffs, United Kingdom 1985). Originally, Conway (Melvin E. Conway. A Multiprocessor System Design. In *Fall Joint Computer Conference,* pages 139-146. AFIPS, Spartan Books (vol 24), October 1963) introduced the join instruction with a counter argument. The counter must be initialized with the expected number of threads to join, and is decremented atomically upon each join until it reaches value 0. The thread executing the join when the counter reaches value 0 continues execution of the instruction.]

In a preferred embodiment of the present invention, the instruction fork <label> creates a software thread that must be mapped into a hardware thread, which then shepherds the execution of the code block beginning at instruction address label (<label>). The instruction "join lr" synchronizes the forking and the forked thread. Register lr is the link register; its use is explained in detail below.

We illustrate our thread model and the semantics of the fork and join instructions by means of the example in FIGS. 1A-1C. FIG. 1A shows a code fragment consisting of two functions, "foo" and "bar." Function "foo" contains code blocks A, B and C. By definition, a code block shall not contain any fork or join instructions. Before code block B, "foo" forks function "bar", so that code block D may execute concurrently with code block B. The control flow of functions "foo" and "bar" synchronizes by means of the respective join statements, which enforces that code block C is executed only after executing the join statements behind (in textual order) code blocks B and D. The code fragment specifies two software threads, one associated with function "foo", and the second with function "bar." We denote a software thread executing a fork instruction a software forker thread, and the associated forked thread the software forkee thread. (Our naming of forker and forkee borrows from the naming of caller and callee of function calls to emphasize the close semantic relationship.)

The diagrams in FIGS. 1B and 1C illustrate two assignments of the individual code blocks of the software threads to hardware threads T0 and T1. Vertices in these diagrams represent fork and join instructions, and the wiggly lines represent code blocks. We call the hardware thread shepherding a software forker thread the hardware forker thread, and the hardware thread that picks up the associated software forkee thread the hardware forkee thread. As we will see, fork degradation permits a hardware thread to execute both software forker and forkee thread. Thread T0 in FIGS. 1B and 1C is a hardware forker thread, because it executes statement fork "bar"; of the software forker thread associated with function "foo." Thread T0 shepherds the execution of initial code block A. When the fork instruction executes, forker T0 creates a new software thread, which is assigned to hardware forkee thread T1 that shepherds the execution of the forkee block D.

In FIGS. 1B and 1C, the hardware forker continues execution with the instructions after the fork statement, that is, with code block B. Alternatively, we could have chosen the opposite assignment, where the hardware forker shepherds the software forkee, and a new hardware thread continues execution of the software forker. However, a preferred embodiment utilizes the option illustrated in FIGS. 1B and 1C, because instantiating a new hardware thread to execute the software forker would include copying the state of the runtime stack. Our preferred embodiment avoids this potential source of overhead, and is, therefore, better suited to support fine-grained software threads.

Forker thread T0 and forkee thread T1 exist concurrently, and execution of their associated code blocks shall proceed in an interleaved fashion on our multithreaded processor. Both threads synchronize by means of the join instruction. Execution resumes only after both threads have reached the corresponding join instructions. In principle, this leaves us with four options for choosing a thread mapping to continue execution after the synchronization point: (1) terminate both hardware forker and forkee threads, and pick a new hardware thread to continue execution, (2) the hardware forker thread always continues, or (3) the hardware forkee thread always continues execution after the synchronization point, (4) one of the hardware forker or the forkee threads, picked by some criterion at runtime, continues execution. The original fork/join scheme proposed by Conway (Melvin E. Conway. A multiprocessor System Design. In *Fall Joint Computer Conference*, pages 139-146. AFIPS, Spartan Books (vol. 24), October 1963.) corresponds to option four, where the last thread reaching its join instruction in time continues to shepherd execution. Many multithreaded architectures, such as HEP (Burton J. Smith. Architecture and Applications of the HEP Multiprocessor Computer System. In $4^{th}$ *Symposium on Real Time Signal Processing*, pages 241-248. SPIE, 1981.), and computational models including TAM (David E. Culler, Seth C. Goldstein, Klaus E. Schauser, and Thorsten von Eicken. TAM-A Compiler Controlled Threaded Abstract Machine. *Journal of Parallel and Distributed Computing*, 18(3):347-370, July 1993.) follow this proposal as well. The advantage is that the first thread reaching its join instruction may terminate and be reused immediately without blocking any hardware thread resources.

To facilitate an efficient implementation of the hardware structures for thread management, we pick the second option: (Forker-Continues Invariant) After synchronizing a forker and its corresponding forkee, the forker thread continues shepherding execution.

A primary advantage of the forker-continues invariant is that it matches the single-threaded execution scenario, which enables us to degrade a fork seamlessly into a function call in case when all hardware threads are assigned already. FIG. 2B illustrates the single-threaded execution of the code fragment of FIG. 2A. We introduce fork degradation as an analogy between a multithreaded and a single-threaded execution. Fork degradation is an isomorphism mapping forker to caller, forkee to callee, and interpreting the fork and join instructions as function call, return, and a nop, as shown in FIG. 2B. Rather than forking function "bar", we call function "bar" by jumping to label "bar" and saving the return address in link register lr. The join instruction in function "bar" is interpreted as a return jump to the link register address. The join instruction in function "foo" is redundant, because no synchronization is needed in case of a single-threaded execution. Hence, we interpret the join instruction in function "foo" as a nop.

Our architecture maps software threads into hardware threads with the new ability to degrade a fork into a function call when the hardware thread resources are exhausted. This graceful degradation has three important implications:

Fork degradation increases the granularity of a hardware thread by executing an unsuccessfully forked software thread as a callee in the context of the hardware forker thread.

The programmer or compiler may fork as many software threads as desired or inherent in an application without being aware of the limited number of hardware threads.

Since our multithreaded architecture implements fork degradation essentially without a performance penalty, the task of specifying excess parallelism by forking a large number of software threads should be viewed as default programming style. (There is one beauty spot, however, which is the caller's join instruction, which stalls the pipeline by one cycle.)

To substantiate these claims, we discuss the archetypical Fibonacci computation as an example. Shown in Table 1 is a tree-recursive version in the ML language, which has been instrumented with a fork application to effect the creation of a thread.

TABLE 1 fun fib (n : int) : int=
  if n<2 then
    1
  else
    fib (n−1) +fork (fib (n−2) ) ;

Unless procedure fib reaches the base case (n<2), we call fib with argument (n−1) and fork a new thread to evaluate (fib (n−2)). (We assume evaluation of the list of procedure arguments in reverse order, as for example implemented in MIT Scheme (Harold Abelson and Gerald J. Sussman with Julie Sussman. *Structure and Interpretation of Computer Programs*. MIT Press, 2nd edition, 1996.), so that the evaluation of second argument of the addition is forked before evaluation the first argument (fib(n−1)) begins. After both computations are complete, we add the results. The join instructions are (conveniently) implicit in the program representation. FIGS. 3A and 3B illustrate the tree-recursive evaluation of fib(6). We show a fork tree 300 without closing the DAG via join vertices, because the join structure is symmetric. The fat arcs indicate forked threads, and the slim arcs correspond to regular function calls. The evaluation tree in FIG. 3A includes seven successful forks. Accordingly, the enumeration of the software threads results in a total of eight threads. Thus, eight hardware threads would be sufficient to service each fork encountered during evaluation. For example, thread T0 shepherds fib(6), represented by the root vertex 306. Thread T0 forks fib(4) fat arc 302 and calls fib(5) (slim arc 304). Thread T1 is assigned to shepherd fib(4) (vertex 308) while thread T0 continues to shepherd fib(5) (vertex 310).

Evaluation tree 301 in FIG. 3B assumes that the hardware provides only four rather than eight threads. We assume that hardware thread T0 forks thread T1 (fat arc 312) to shepherd the evaluation of fib(4) (vertex 313). Subsequently, thread T0 forks threads T2 and T3 (fat arcs 314 and 316), at which point the four available hardware threads are exhausted. Now, assume that thread T1 attempts to fork fib(2) as part of evaluating fib(4). Since no more threads are available, the fork degrades into a function call (slim arc 318), and thread T1 shepherds procedure fib which executes as if the fork were not present in the program text at all. Form a programmer's perspective, a fork can be considered as a hint to the processor to create a thread.

The insight to be gained from the preceding example is the following. In a properly balanced machine, sufficiently many hardware threads are available to provide the desired performance benefit due to memory latency hiding, yet no more than a bounded number to facilitate a space-efficient implementation of the thread management structures in hardware. The larger the number of software threads, the greater the number of opportunities are presented to the architecture—by means of fork instructions—to map software threads into distinct hardware threads. Thus, our architecture enables the programmer to produce excess parallelism by means of software threads to increase the utilization of hardware threads. Fork degradation enables us to map a potentially unbounded number of software threads into a bounded number of hardware threads.

Thread Mapping

Our distinction of hardware threads as shepherds for software threads introduces the problem of mapping software threads into hardware threads. We note that the number of software threads a program may fork is potentially unbounded. As an example, consider the program fragment in FIG. 4 with a fork statement in the loop body of function "bar" (We use C syntax for the sample program, assuming that fork has been introduced as a new keyword.) using Conway's join counters. The forker thread, which shepherds function "bar", forks n forkee threads before joining. Thus, there are n+1 software threads that may reach a join statement. The forker thread reaches the join statement at the end of function "bar", and each of the forkees reaches the join statement of function "foo." In this example, the number of software threads is unbounded since the value of variable n could be arbitrarily large. In a naive approach of mapping software threads to hardware threads, we might maintain an unbounded number of n+1 hardware threads, which is quite objectionable for a hardware design.

Now, consider the alternative design of a machine with four hardware threads and fork degradation. We do not use a join counter. Instead, we assume that two join statements are executed for each fork, one by the forker and the other by the associated forkee. Therefore, the code fragment of FIG. 4 may change into the version shown in FIG. 5. The number of software threads created by the forking loop of "bar" is n, analogous to the preceding example in FIG. 4. However, the number of hardware threads utilized in the presence of fork degradation depends on the execution time of function "foo."

FIGS. 6A & 6B illustrate two possible execution scenarios of the code fragment in FIG. 5. The scenario in FIG. 6A assumes that function "foo" requires a large execution time, and the scenario in FIG. 6B assumes a relatively short execution time. In FIG. 6A, threads T1, T2, and T3 are created to shepherd iterations i∈{0,1,2}, respectively, before the resources of the machine, four hardware threads, are exhausted. Since the three hardware threads T1, T2, T3 run for a relatively long time, the fork instruction for iteration i=3 fails, and thread T0 executes foo(3) as a regular function call, that is the fork instruction degrades into a function call, and the software thread forked for foo(3) is mapped to hardware thread T0. Note that all threads are utilized in this scenario, maximizing chances for effective memory latency hiding.

The example in FIG. 6B illustrates the contrasting scenario, where the execution time of function "foo" is so short that hardware thread T1 joins before forker T0 has been able to fork foo(2). If we require that both the forker and forkee hardware threads must join before we can reassign the forkee hardware thread, the thread schedule of this scenario would resemble that of FIG. 6A. That schedule is likely to be inefficient since thread T0 would shepherd n−3 of n executions of function "foo" while threads T1 to T3 would be blocked waiting for the synchronization by T0. Fortunately, we can improve hardware thread utilization, if our mapping of software threads into hardware threads would support reusing forkee hardware threads before synchronization with their forker thread. In the example of FIG. 6B, we reuse thread T1 to shepherd foo(2), thread T2 to shepherd foo(3), and so on. Our proposed architecture supports reuse of forkee threads as implied in FIG. 6B.

At this point it should be noted that reuse of hardware forkee threads does not provide a guarantee against blocking hardware threads. It is possible to devise programs with a fork structure that is wasteful in terms of hardware thread utilization. FIG. 7 shows an example program fragment 700 with n+1 software threads and its corresponding fork/call tree 702. Function "foo" forks itself recursively, performs some computation, and joins with its forkee. In this scenario, the join statement of the forker will block the shepherding hardware thread. Due to our forker-continues invariant, we cannot reuse the hardware forker thread without saving its state, preventing its reuse. This is in contrast to reusing the forkee, which we can terminate without waiting for the forker. In the example of FIG. 7, eventually, all but one hardware thread will be blocked, and the active hardware thread will execute the program sequentially. This example demonstrates the asymmetry caused by the forker-continues invariant. We may reuse forkee threads, as demonstrated in FIG. 6B, but cannot reuse forker threads without a significant performance penalty.

We can salvage this situation in one of four ways: (1) We may declare programs such as the one in FIG. 7 as unreasonable and blame the programmer. (2) We may increase the number of hardware threads to ameliorate the lack of memory latency hiding potential due to blocked threads. This brute-force solution does not solve the pathological example of FIG. 7. (3) We might implement a thread switch in software that saves the state of a blocked hardware thread in dynamically allocated memory, in order to facilitate reuse of the thread. (4) We could devise hardware support for converting a failed fork into a successful fork. This is the reverse operation of our method of graceful degradation of a fork into a function call. The latter option is the most desirable, yet requires an appropriate language model, such as Scheme, in order to be implemented with reasonably low complexity. A key functionality to be provided by the reverse operation is to enable the caller after a failed fork, so that is can resume execution shepherded by a new thread while the original thread shepherds the callee function.

Microwidgets for Thread Management

At the core of our multithreaded processor is the design of microarchitectural structures for managing hardware threads efficiently. In particular, we need a hardware structure, the thread table, for tracking the relationship between forker and forkee threads to implement the synchronizing join operations. Our goal is a space-efficient structure that enables the implementation of fast thread management operations. We pursue this goal with a bookkeeping structure of limited size that maintains a bounded number of threads, so that thread creation, termination, and selection can be implemented with fast circuits within a bounded area.

In the following, N shall be the number of hardware threads supported by our architecture. Furthermore, thread operations refer to hardware threads unless specified explicitly. For example, thread creation refers to allocating a hardware thread, and thread termination means releasing a hardware thread. We split the discussion of the proposed microarchitecture into three parts: (1) we introduce the hardware thread table, (2) we discuss the use of the link register to support an unbounded number of software threads despite a bounded number of hardware threads, (3) we illustrate the function of both thread table and link register by discussing three execution scenarios.

Thread Table

Figure 8:
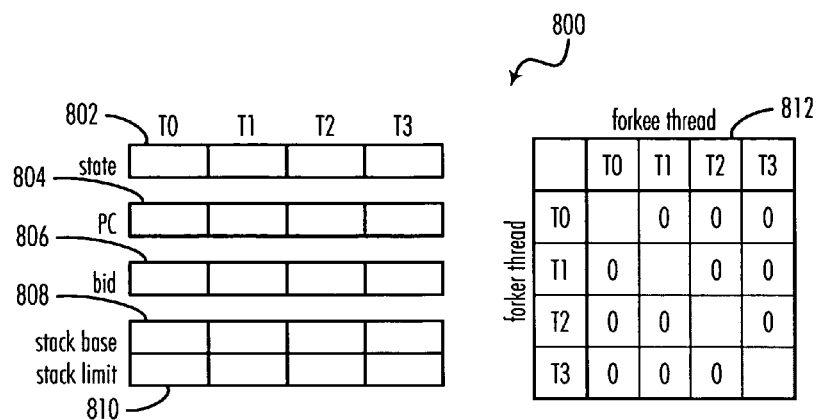
FIG. 8 is a diagram of a thread table constructed in accordance with a preferred embodiment of the present invention.

FIG. 8 shows the organization of a thread table 800 for N=4 hardware threads. Each hardware thread consists of a state field 802, a program counter 804, an identifier for a blocking thread 806, and base and limit addresses of the runtime stack (808 and 810, respectively). In addition, we maintain a 2-dimensional table 812 of $N^2-N$ join bits, one for each pair of forker and forkee thread. The join bit records whether the forkee is active, that is whether it has executed (join-bit value 0) or has not (join-bit value 1) executed the corresponding join instruction.

The set of states for a hardware thread include the following, which should not be interpreted as being exhaustive. Additional states may be introduced in support of features such as atomic regions, for example, without departing from the scope and spirit of the present invention. States 'load-blocked' and 'load-commit' support a split load operation, and are described in more detail in a subsequent section of this description.

unused: the thread is not assigned to a software thread, and may not be scheduled for execution. Instead, it is available for shepherding a newly forked software thread.

active: the thread is actively shepherding a software thread, and may be scheduled for execution.

join-blocked: (applies to forker threads only) A forker thread has executed a join instruction, but the forkee has not executed the corresponding join instruction. The thread may not be scheduled for execution.

load-blocked: The thread has issued a load instruction to memory, which has not responded yet. The thread may not be scheduled for execution.

load-commit: The thread has an outstanding memory request, which has been serviced by the memory. The thread should be scheduled for execution to finalize the pending memory transaction.

The program counter (PC) of a hardware thread (program counter 804) in FIG. 8 contains the memory address of the next instruction to be executed. Our architecture permits issuing an instruction of one thread per clock cycle. There is no context switch overhead across hardware threads. Just the opposite, a preferred embodiment supports a default mode of operation where instructions of different threads will be issued during each clock cycle, as was implemented in HEP.

Blocking thread identifier field (bid) 806 in FIG. 8 is needed to enforce the forker-continues invariant. This field stores the thread identifier of a thread's forkee, in case the forker thread executes the join instruction before the forkee. For example, if thread T0 forks thread T1, and T0 executes the join instruction before forkee thread T1 reaches the corresponding join instruction. Forker thread T0 must block until thread T1 reaches the join instruction. Should forker thread T0 fork more than one forkee thread, we must ensure that T0 is reactivated only when thread T1 reaches the join instruction. To that end, we record the thread identifier of the forkee in the bid field of forker thread T0. Bid field 806 is described in detail in a later section of this description.

Stack base and limit fields 808 and 810 of thread table 800 in FIG. 8 record the range of memory assigned for the runtime stack of each hardware thread. Typically, an operating system may assign the ranges when booting the processor. Each hardware thread obtains a private runtime stack as scratch memory for the software threads it shepherds. Typically, the runtime stack is used for local variables of functions called by a software thread, in particular those called due to a failed fork attempt.

Join-bit table 812 records the activity of a forker's forkee threads. This table can be implemented as an N×N-bit SRAM, for example. Each row is associated with a forker thread. If a forkee is active and has not executed the corresponding join instruction yet, the join bit is assigned value 1, otherwise value 0. Join-bit table 812 enables us to reuse forkee threads if they join before the forker executes the corresponding join, see FIG. 6B. (If the reuse of forkee threads were not desired, we could replace the join-bit table with as set of stacks. One stack of forkee identifiers per forker thread would be sufficient to reduce to space requirements from $O(N^2)$ for the join-bit table to $O(N \log N)$ for N stacks with a total of N entries of log N bits per thread identifier.) We discuss the use of the join-bit table in greater detail in a later section of this description.

Extended Link Register Semantics

The reuse of hardware threads—in case of forkees—can lead to the situation where a potentially unbounded number of join statements are yet to be executed by active forker threads while the corresponding forkee threads have long been terminated. FIGS. 5, 6A, and 6B illustrate this case, where a single forker thread T0 has an arbitrarily large number of n forkees before it executes the corresponding n join statements. We need to record the information about success or failure of the fork instructions somewhere to enable proper interpretation of the corresponding join instructions by the forker thread. Since managing an unbounded amount of state is generally more efficient in software than in hardware, we wish to pass this information from the hardware to software. To that end, we employ an established mechanism, the link register, and extend its use to support fork and join instructions. In this section, we describe the refinement of the link register semantics.

As a prelude, we offer a brief review of the conventional use of the link register in support of function calls. Instructions such as jal, short for jump-and-link, have been invented to reduce the overhead of function calls (John Hennessy and David Patterson. *Computer Organization and Design*. Morgan Kaufmann, 2nd edition, 1998.) Not only does the jal instruction redirect control flow by jumping to the specified function entry point, it also assigns the address of the instruction behind (in program text order) the jal instruction, the link address, as a side effect to a dedicated link register lr. The link address serves as return address for the callee, so that the function return can be accomplished with a jump instruction to the address stored in the link register. Thus, the jal instruction relieves the programmer or compiler from assigning the return address explicitly before jumping to a function, and reduces the program to one instruction per function call.

We extend the semantics of the link register to support the fork and join instructions of our multithreaded processor architecture in a fashion compatible with the conventional function call. We use the link register to expose the state associated with a potentially unbounded number of threads to software which, in turn, is responsible for spilling its contents on the runtime stack and restoring it before the corresponding join if necessary.

Figures 9A, 9B:
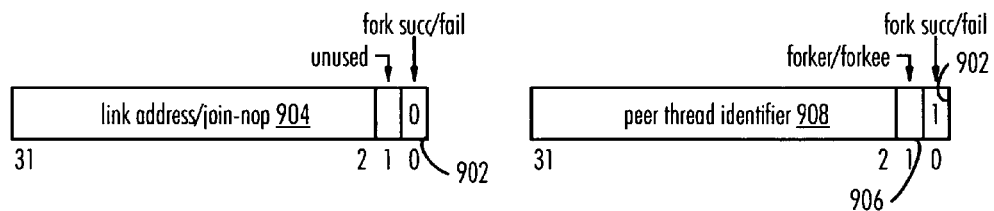
FIG. 9A is a diagram of the contents of a link register generated in response to a failed fork in accordance with a preferred embodiment of the present invention.
FIG. 9B is a diagram of the contents of a link register generated in response to a successful fork in accordance with a preferred embodiment of the present invention.

The fork instruction generates the contents of the link register as a side effect, analogous to a jal instruction. The information assigned by the fork instruction is needed for interpreting the associated join instructions, just like the returning jump uses the link address in the case of a function call. Three pieces of information are passed from a fork to the associated joins, as illustrated in FIGS. 9A and 9B: (1) Bit 902 enables us to distinguish between a successful or unsuccessful fork. (2) If the fork is unsuccessful (as in FIG. 9A) and degrades into a function call, the remaining bits of the link register (bits 904) shall contain the conventional link address. When interpreting the corresponding join instruction in the callee as a return statement the link address is replaced with value zero, which is not a valid link address. Then, during execution of the corresponding join instruction in the caller, a test for value zero is made to determine whether to interpret the join as a nop. (3) If the fork succeeds (as in FIG. 9B), the architecture creates two link register values, one for the forker and one for the forkee thread. Forker/forkee bit 906 identifies the thread as forker or forkee, and remaining bits 908 encode the peer thread identifier. The peer thread identifier associated with a forker is the forkee identifier and vice versa. Together, the identifier of a running thread and the identifier of the peer thread in the link register facilitate selection of the associated join bit in the join-bit table.

Table 2 summarizes the four usage cases of the link register including assignments to the individual register fields. The fork success/fail field and the forker/forkee field require one bit each. As illustrated in FIGS. 9A and 9B, we might use the least significant bits of a 32-bit, big-endian architecture with 32-bit alignment of instruction words to store these two fields, because these two byte-selector bits are typically unused anyway.

TABLE 2

| lr field | | | |
|---|---|---|---|
| succ/fail | fkr/fke | peer tid/link value | description |
| succ | forker | forker tid | fork succeeded; peer is forkee tid |
| succ | forkee | forker tid | fork succeeded; peer is forker tid |
| fail | — | link address | fork failed; return to link address |
| fail | — | 0 | fork failed; join nop |

The following pseudo-assembly code (Table 3) demonstrates the use of the link register in the presence of two nested forks. When function fork-foo-bar is entered, the link register shall hold its return address, as would be generated by a jal instruction.

TABLE 3 fork-foo-bar:

| | |
|---|---|
| sub sp, sp, 8 | # create stack frame |
| st lr, 0 (sp) | # spill link register for return |
| fork "foo" | # first fork (assigns lr) |
| st lr, 4 (sp) | # spill link register for join with "foo" |
| fork "bar" | # second fork (assigns lr) |
| ⋮ | |
| join lr | # join "bar" |
| ld lr, 4 (sp) | # restore link register for join with "foo" |
| join lr | # join "foo" |
| ld lr, 0 (sp) | # restore link register |
| add sp, sp, 8 | # destroy stack frame |
| jr lr | # return |

In this code fragment the link register is used for three purposes: (1) to pass the return address of fork-foo-bar to the returning jump at the end of the program, (2) to pass the link information generated by the first fork instruction to the corresponding join, and (3) to pass the link information of the second fork instruction to the corresponding join. We need to spill the link register value twice onto the runtime stack, first to save the return address before the fork overwrites this value, and second to save the value generated by the first fork instruction before the second fork instruction overwrites that value. Note that the fork/join pairs for "foo" and "bar" are nested. Thus, we do not need to spill the link register between instruction fork "bar" and the subsequent join lr, assuming the program contains no further function calls or forks between these instructions. The use of the link register in support of fork/join pairs is compatible with the use for function call/return pairs, including common conventions for function calls and register spilling.

Three Execution Scenarios

In the following, we discuss three execution scenarios of multithreaded programs. The first scenario illustrates the basic use of the thread table and link register. The second scenario shows how the join-bit table enables the reuse of relatively short-running forkee threads. The third scenario illustrates some of the advantages of fork degradation when a fork attempt fails. We assume that the thread table comprises four threads, and that hardware thread T0 shepherds execution of the initial software thread of a program.

Execution Scenario 1

Figure 10A:
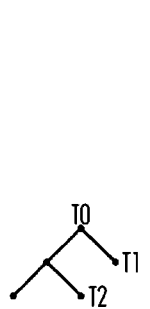
FIG. 10A is a fork/call tree diagram depicting a first illustrative execution scenario of a preferred embodiment of the present invention.
Figure 10B:
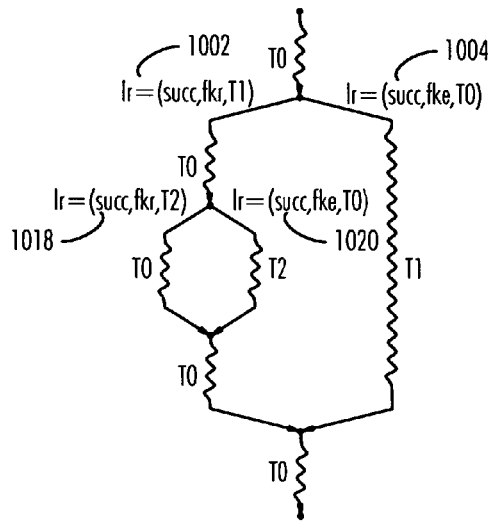
FIG. 10B is a thread fork/join diagram depicting the illustrative execution scenario described in FIG. 10A.
Figure 10C:
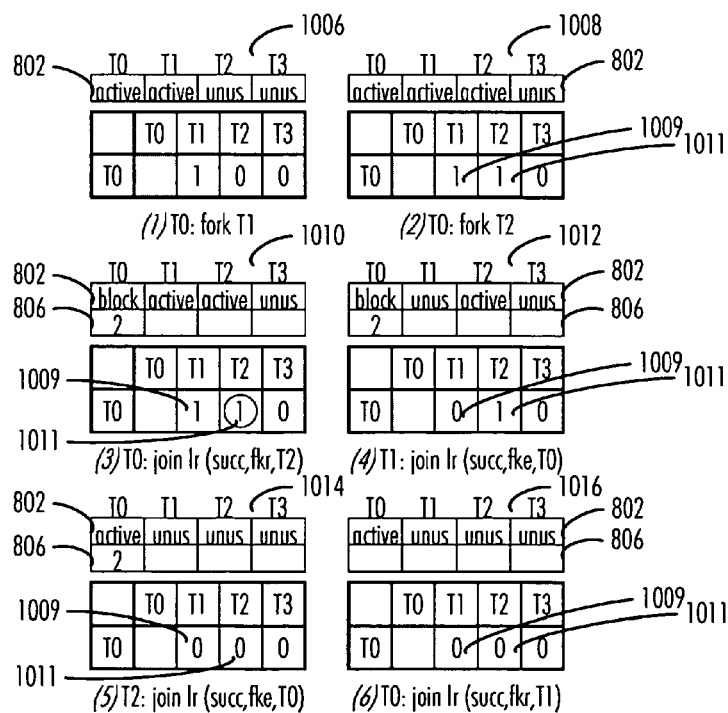
FIG. 10C is a diagram illustrating the sequence of states of a thread table in the illustrative execution scenario described in FIG. 10A.

FIGS. 10A, 10B, and 10C illustrate a basic multithreaded execution scenario. Hardware thread T0 forks a first software thread that is mapped to hardware thread T1. While thread T1 is active, thread T0 forks another software thread, which is mapped to hardware thread T2. The fork tree structure of this multithreaded program is shown in FIG. 10A. The thread diagram in FIG. 10B includes the link register triples (as per FIGS. 9A and 9B) generated for the forker and forkee threads. FIG. 10C shows the state transitions of the relevant portions of the thread table as it transitions due to fork and join events. For each step, the table depicts the state immediately after committing the transitions caused by the instruction shown underneath with the shepherding thread identifier and the link register value if applicable. Initially, we assume that thread T0 is the only active hardware thread, the state of all other threads shall be 'unused', and all join bits are initialized to 0.

The first event during execution is the fork performed by hardware thread T0, shown as stage 1006 of FIG. 10C. We assume that our thread table management hardware detects that thread T1 is unused, so that the fork request completes with success. Consequently, the link register value passed to thread T0 assigns the fork success bit, assigns the forker bit, since T0 is a forker thread (link register triple 1002 in FIG. 10B), and records thread T1 as forkee thread. The link register value generated for forkee thread T1 assigns the fork success bit, marks the thread as forkee, and assigns thread T0 as forker thread (link register triple 1004 in FIG. 10B). The link register values are assigned analogously during the second successful fork event (link register triples 1018 and 1020). At this point in time, the thread table contains three active threads T0, T1, and T2. Forker thread T0 has two active forkee's T1 and T2, which is reflected by join bits 1009 and 1011 in state 1008 of FIG. 10C.

Next, we assume that the third event is that thread T0 executes a join instruction. In other words, forker T0 is the first of two threads, forker T0 and forkee T2, to attempt synchronization. Link register contents 1018 identify the shepherding thread as a forker with forkee T2. This facilitates looking up join bit 1011 in row T0 and column T2. Since join bit 1011 has value 1, the forkee is still active, and forker T0 must block until forkee T2 executes the corresponding join statement. We switch state (state field 802) of thread T0 to 'block', and record identifier 2 of blocking thread T2 in the bid field of T0 (bid field 806).

The fourth event is the execution of the join instruction by thread T1 (state 1012). Link register contents 1004 identifies thread T1 as a forkee with forker T0. To facilitate reuse of the forkee thread, we terminate thread T1 by assigning state T1 'unused' (state field 802) and toggling the associated join bit 1009 to value 0. Thread T0 remains blocked.

Next, the only possibility for event five is that thread T2 joins (state 1014). Using link register contents 1020, we identify T2 as a forkee, which allows us to terminate T2 by assigning state 'unused' and toggling join bit 1011 in the row of forker T0. Furthermore, thread T2 blocks thread T0, as recorded in the bid field of T0. Consequently, forker T0 may continue execution. We reactivate thread T0 by assigning 'active' to its state field (state field 802).

Thread T0 executes the last join instruction as event six (state 1016). Thread T0 joins with forkee thread T1. Since the associated join bit (join bit 1009) is 0, we deduce that T1 has terminated already. Thus, thread T0 continues execution without changes to the thread table.

Execution Scenario 2

FIGS. 11A-11C illustrate a threaded execution scenario with reuse of forkee threads. Compared to Scenario 1, we assume that the execution time of thread T1 is so short that it terminates before thread T0 executes the second fork statement.

The first event of Scenario 2 is the same as in Scenario 1. Thread T0 forks a software thread which is assigned to hardware thread T1. Thus, the state of thread T1 changes from 'unused' to 'active', and the join bit of forker T0 and forkee T1 assumes value 1, as shown in state 1106 of FIG. 11C.

Unlike in Scenario 1, we assume that the second event is thread T1 performing a join. Since T1 is a forkee, we terminate T1 by reassigning 'unused' to its state and toggling the join bit to value 0. State 1108 in FIG. 11C is identical to the initial state before the first fork.

As the third event (state 1110), thread T0 forks a second software thread. Since thread T1 is unused, we may reuse T1 to shepherd the new forkee of T0. We record the mapping by assigning 'active' to the state of thread T1 and toggle the join bit to value 1. The thread table is now in the same state than after the first fork event. Obviously, there is a difference due to the event history, however, which is encoded in the link register values.

Thread T0 joins as the forth event during execution (state 1112). The link register identifies T0 as forker and the corresponding forkee thread as T1. Since the associated join bit has value 1, indicating that T1 is still active, we block thread T0. We record T1 in the bid field of T0.

Next, thread T1 joins as the fifth event (state 1114). According to the fork structure, this join corresponds to the second fork of thread T0. Using link register value 1115, we may terminate T1 because it is a forkee. Furthermore, we reactivate forker thread T0 which has been blocked in the synchronization waiting for T1.

As the last and sixth event (state 1116) thread T0 joins with forkee thread T1, which has terminated already. Thus, thread T0 continues execution without modifications to the thread table.

Note that the reuse of thread T1 is not recorded in the thread table at all. Instead, the thread table records at each point in time which hardware threads are active forkees. The fact that hardware threads are reused is encoded implicitly by the link register values, which the software must spill on the runtime stack to support nested fork structures.

Execution Scenario 3

Figures 12A, 12B:
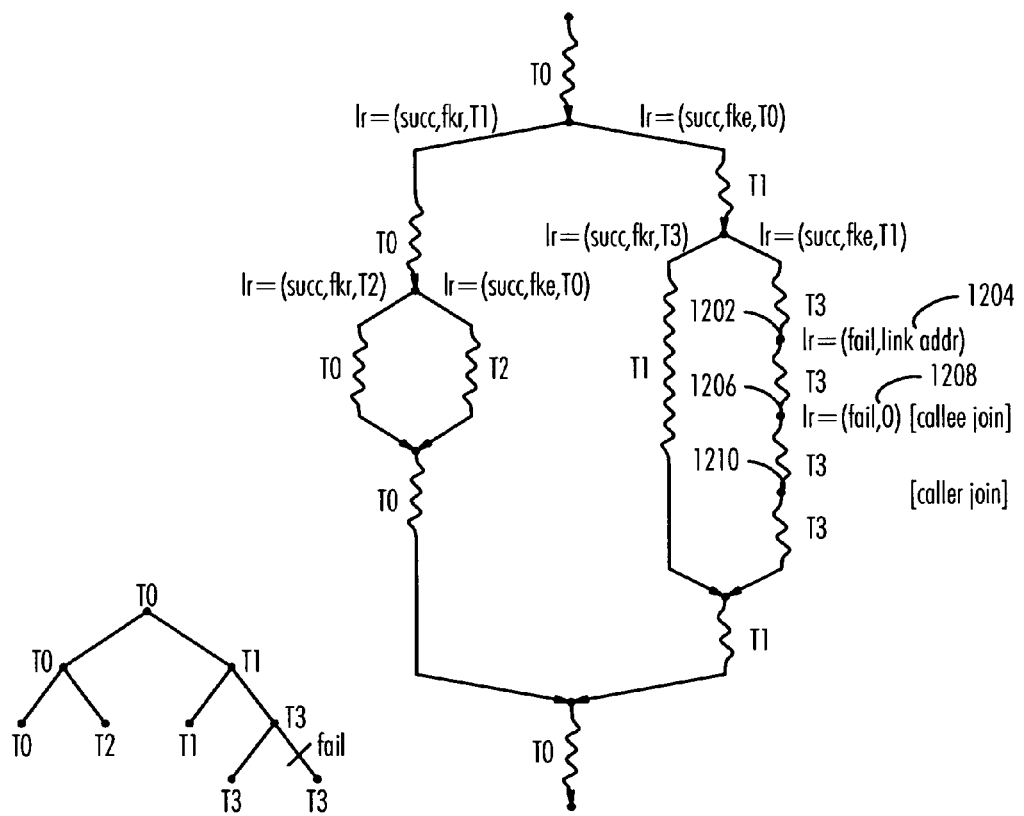
FIG. 12A is a fork/call tree diagram depicting a third illustrative execution scenario of a preferred embodiment of the present invention.
FIG. 12B is a thread fork/join diagram depicting the illustrative execution scenario described in FIG. 12A.

FIGS. 12A and 12B illustrate a more elaborate execution scenario. For simplicity of presentation, the state transitions of the tread table are not depicted, but may be derived as in FIGS. 10C and 11C. The fork tree in FIG. 12A illustrates the underlying fork structure. Thread T0 forks thread T1 and subsequently thread T2. Thread T1 forks thread T3. At this point the four hardware threads of the machine are in use. When thread T3 forks another software thread, the mapping into a hardware thread fails, and T3 executes the forked software thread by degrading the fork into a function call.

The thread diagram in FIG. 12B shows the link register values exported by the hardware to software. The interpretation of the link register values assigned by the successful forks proceeds in an analogous manner to Scenarios 1 and 2. Therefore, we limit our discussion to the case of the failed fork.

When thread T3 executes its fork instruction (point 1202 in FIG. 12B), all four hardware threads of our machine are active already. The fork fails because no more hardware threads are available to shepherd the new software thread. Hence, the fork degrades into a function call, and the newly assigned link register of thread T3 encodes the failure as well as the return address for the callee (link register contents 1204). Thread T3 proceeds shepherding the callee until it reaches the callee's join instruction at point 1206. The processor identifies this join as a returning jump, because of the fail bit in the link register and because the link address is non-zero. As a side-effect of the join instruction, the processor replaces the link address with value zero as a preparatory step for the interpretation of the next (in temporal order) join instruction (link register contents 1208). After the returning jump, thread T3 continues shepherding the execution of the caller which ends in a join instruction point 1210. The link register indicates a failed fork and contains a zero link address. Therefore, the hardware interprets the caller join as a nop.

Note that no bookkeeping is required in the thread table to cope with an unsuccessful fork attempt. The thread table is merely inspected by the fork instruction to identify that no hardware thread is available for shepherding a new software thread.

Latency Hiding

The primary purpose of multithreading is latency hiding. Early computer designs such as Bull's Gamma 60 (M. Bastaille. Something Old: The Gamma 60, The Computer that was Ahead of Its Time. *Honeywell Computer Journal,* 5(3): 99-105, 1971.) used a primitive form of multithreading to hide the latency of all machine operations, including arithmetic, memory accesses, and I/O. Later designs (Burton J. Smith. Architecture and Applications of the HEP Multiprocessor Computer System. In 4th Symposium on Real Time Signal Processing, pages 241-248. SPI, 1981.) emphasized the use of multithreading for memory latency hiding in multiprocessors, where memory access latencies are fundamentally large because they are dominated by communication distances. Due to today's microtechnologies, even single-processor architectures suffer from the so-called memory wall (William A. Wulf and Sally A. McKee. Hitting the Memory Wall: Implications of the Obvious. *Computer Architecture News*, 23(1):20-24, 1995.) Although the integration of memory latency hiding within our multithreaded processor is independent of the implementation of fork degradation, it does impact the design of the thread scheduler. Therefore, we discuss this topic as far as it relates to our proposal.

Memory Latency Hiding

Figure 13:
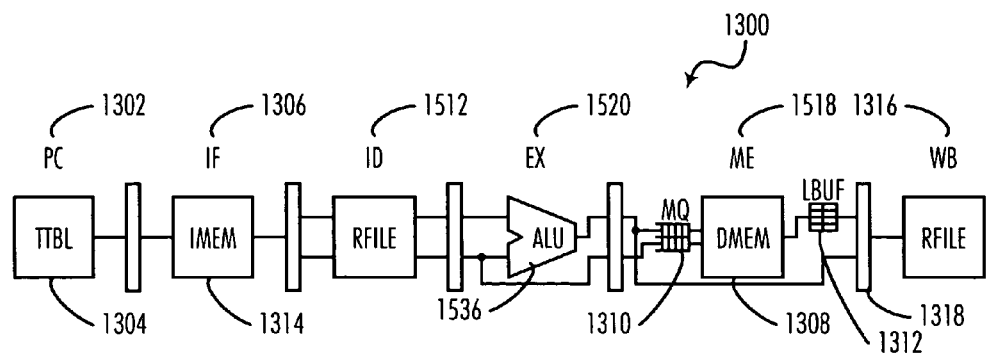
FIG. 13 is a diagram of a datapath utilized in a preferred embodiment of the present invention.

FIG. 13 is a diagram of a datapath 1300 of a pipelined multithreaded processor. Picking a particular architecture, even at the bird-eyes' view of this sketch, enables a concrete discussion of the issues effecting memory accesses, although one of ordinary skill in the art will recognize that any of a number of different datapath designs may be used in an actual embodiment of the present invention, without limitation. FIG. 13 is based on a vanilla 5-stage RISC pipeline (John Hennessy and David Patterson. *Computer Organization and Design*. Morgan Kaufmann, 2nd edition, 1998.). We extend the pipeline by one stage, the PC-stage, in front of the instruction fetch (IF) stage. PC-stage 1302 accommodates the thread table and thread scheduler 1304. Thread scheduler 1304 is responsible for selecting an active thread and issuing its program counter to IF-stage 1306.

FIG. 13 emphasizes the structures surrounding the data memory (DMEM) 1308. To prevent load instructions from stalling the pipeline due to high memory latencies, we decouple the data memory from the pipeline by introducing a memory queue (MQ) 1310 and a load buffer (LBUF) 1312. Memory queue 1310 is used to enqueue load and store instructions, while load buffer 1312 stores load values returned by data memory 1308. For a simple design, we assume that load buffer 1312 has one entry per hardware thread, so that each hardware thread can have one outstanding load request. Due to the decoupling, the pipeline does not stall although the latency of data memory 1308 can be arbitrarily large. The latency may even vary depending on the memory design. For example, our architecture hides the memory latency irrespective of whether the memory subsystem includes data caches, or whether the memory is banked or distributed across a larger machine. Although we describe the latency hiding scheme in the context of data memory 1308, the analogous scheme can be applied to instruction memory (IMEM) 1314, from which instructions are loaded.

We illustrate the interaction between the thread scheduler and the decoupled data memory by means of the design of a split load instruction. The split load instruction shall not be part of the instruction set. Instead, we maintain the regular load instruction but implement the instruction such that the hardware interprets the load as a split load. As a concrete example, assume we have a regular load instruction for a RISC pipeline:

lw r9,4(r8)

which loads into register r9 the word stored at the effective address computed by adding immediate value 4 to the value stored in register r8. We split this instruction into two phases, the load issue and the load commit phase to match the organization of the decoupled memory:

| lw lbuf [tid], 4 (r8) | # load issue |
|---|---|
| lw r9, lbuf [tid] | # load commit |

The load issue phase enqueues the tuple consisting of thread identifier tid of the shepherding hardware thread and the effective address into the memory queue 1310. After data memory 1308 has serviced the load request, the loaded value is placed into the field of load buffer 1312 associated with thread tid. Thereafter, the load commit phase reads the value from load buffer 1312 and completes the load by writing the value back into register r9.

The execution of the two phases requires interaction between the thread scheduler and the data memory as follows: when a load instruction traverses the pipeline for the first time, it must be in the load issue phase. Upon enqueuing the load request into memory queue 1310, we assign state 'load-blocked' to the shepherding thread. The load instruction passes through write-back (WB) stage 1316 during the subsequent clock cycle and without stalling the pipeline as if it were a nop. The shepherding thread will not be scheduled for execution until data memory 1308 places the loaded value into load buffer 1312, and signals this event to thread table 1304 by changing the state of the thread to 'load-commit,' the thread scheduler may select the thread at the next opportunity, and reissue the original load instruction, this time in order to commit the load. During the commit phase, the load instruction passes through the pipeline until it reaches the memory (ME) stage 1518. There, it reads the loaded value from load buffer 1312, passes it via ME-pipeline register 1318 to the WB-stage, from where the value is written back into the register file in the same fashion a regular load instruction would be implemented. At this point in time, the execution of the load instruction is complete. The thread state can be reset to the state before the load instruction has been issued for the first time, commonly state 'active.'

Operation Latency Hiding

In this section we describe a generalization from memory latency hiding to hiding the latency of arbitrary operations. This forward looking perspective has potential if microtechnology provides a path to continued frequency scaling.

In the above discussion we describe a manner of implementing memory latency hiding by means of split-loads and thread scheduling. Now, let us revisit the ideas first implemented in the Gamma 60 (M. Bataille. Something Old: The Gamma 60, The Computer that was Ahead of Its Time. *Honeywell Computer Journal*, 5(3):99-105, 1971.) albeit for different technological reasons. We may extend the idea of split operations to any functional unit of the processor; not only to those obviously long running memory and I/O operations, but also to the core functions of a processor, basic ALU operations such as floating-point operations. If we increase clock frequencies in the future, the established practice of pipelining functional units will approach a point of diminishing returns. We anticipate that at some point pipelined circuits may be superseded by unpipelined circuits, because of the relatively large percentage consumed by setup and hold times required by pipeline registers (S. R. Kunkel and J. E. Smith. Optimal Pipelining in Supercomputers. In *13th Annual International Symposium on Computer Architecture*, pages 404-411. IEEE Computer Society Press, 1986.) (Consider the following "back-of-the-envelope" calculation. If the critical path of a functional unit is $t_{cp}$, and the sum of setup and hold times is the latch overhead $t_l$ in an N-stage pipeline, the throughput T of the pipeline is $T \le (N/(N*t_l+t_{cp}))$. Increasing clock frequency leads to circuit designs with an increasing number of pipeline stages N. Asymptotically, we find that the throughput $\lim_{N \to \infty} T=1/t_l$ is dominated by latch overhead.) Our technique of integrating split operations with multi-threading lends itself to handle arbitrarily long running fundamental operations implemented as combinational circuits without pipelining.

Figure 14:
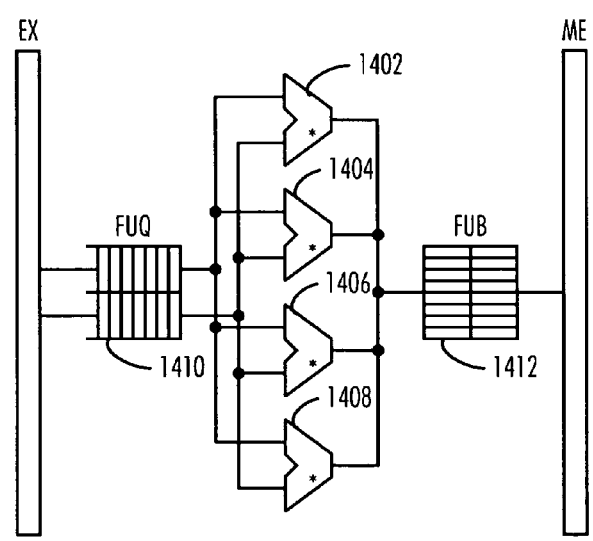
FIG. 14 is a diagram illustrating a partial datapath in which operation latency hiding is achieved in accordance with a preferred embodiment of the present invention.

If future technological trade-offs favor unpipelined circuits, we propose to extend the multithreaded processor architecture with banks of functional units much like we build banked memory systems to support high data throughput. For example, as shown in FIG. 14, rather than using one pipelined floating-point multiplier, we would replicate the multiplier a number of times, (multiplier units 1402, 1404, 1406, and 1408) and decouple the multiplier units from the main processor pipeline by means of an argument queue (FUQ) 1410 and a result buffer (FUB) 1412. The execution of a multiply instruction involves enqueuing the arguments in argument queue 1410 in the issue phase, blocking the shepherding thread, waking up the thread after the multiplier places the result in result buffer 1412, and executing the commit phase to write the result. The replication of multipliers allows us to obtain a desired throughput by executing multiple operations concurrently.

Multithreaded Processor Microarchitecture

In principle, the ideas presented in the preceding Sections can be employed to turn virtually all processor architectures known to date, including pipelined RISC, CISC, stack machines, or graph reducers, into a multithreaded architecture with implicit granularity adaptation. Here, we present an embodiment for one of the most popular of today's processor architectures, the pipelined RISC architecture shown in FIG. 13.

Figure 15:
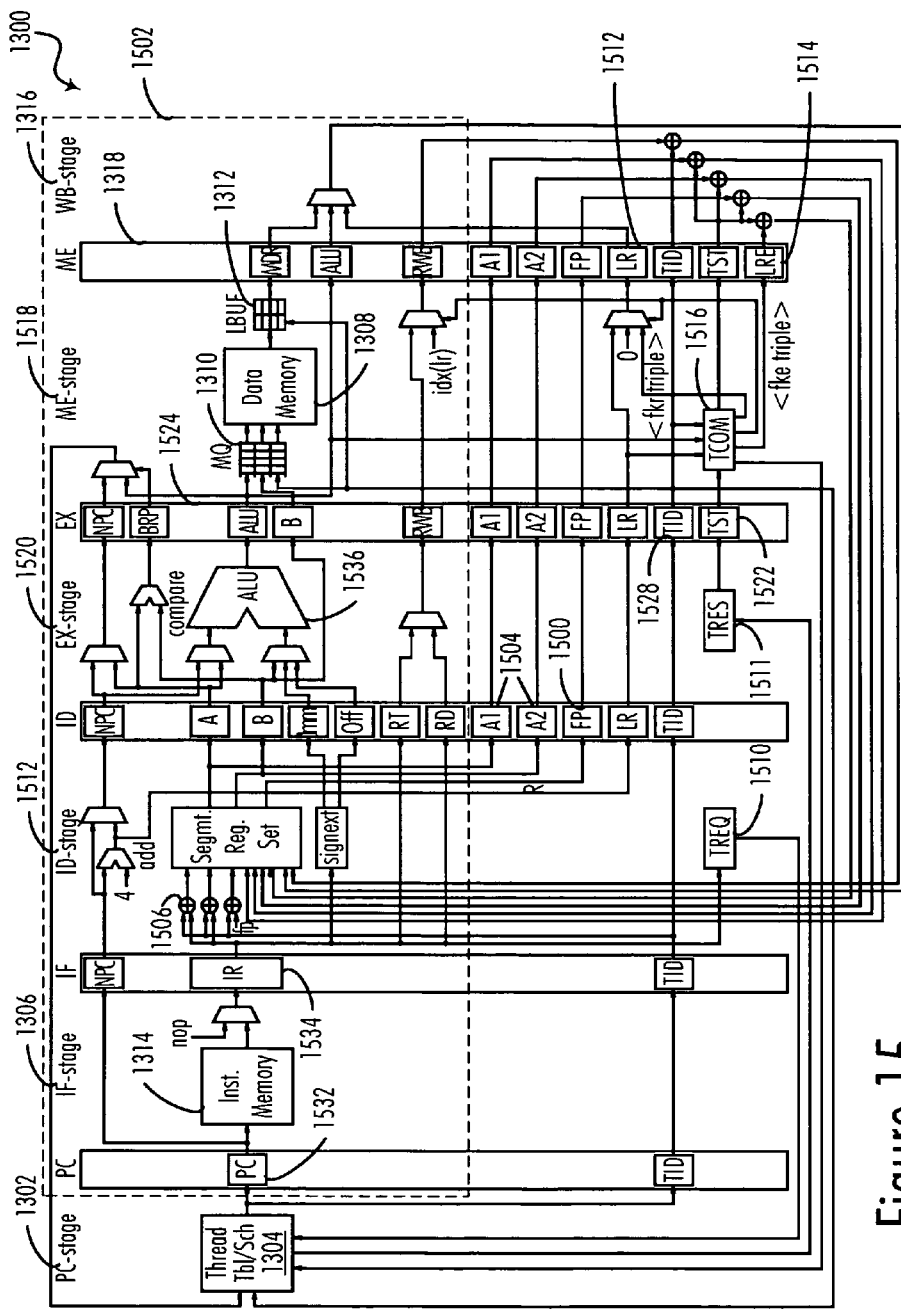
FIG. 15 is a more detailed diagram of the datapath described in FIG. 13.

FIG. 15 provides the microarchitectural details of pipelined datapath 1300, which was introduced in FIG. 13. The portion of the datapath surrounded by the dashed box contains a vanilla RISC core with a 5-stage pipeline (RISC core 1502). We extend the RISC core architecture by four functionalities: (1) a segmented register set providing private registers to each of the hardware threads, (2) copying of argument registers (A1 and A2 registers 1504 exemplify two argument registers) and frame pointer (FP) 1500 across register segments in support of fork and function arguments, (3) support for initializing and range checking of the stack pointer for private runtime stacks of each hardware thread (cf. base and limit registers in FIG. 8), and (4) decoupling of data memory interface 1308 from the pipeline to support one outstanding load request per thread as was discussed above. Each of the other functionalities is needed to support multithreading, yet none of them is directly related to our new feature, fork degradation. Nevertheless, we present a brief review of these established mechanisms.

A segmented register set provides private registers for each hardware thread. Private registers are necessary, for example because multiple hardware threads may execute the same software thread that is the same code fragment. Two threads, both referencing a register by its index, would interfere due to accesses to the same physical register, unless we ensure that each thread owns a private register referenced by the same index. We can implement a segmented register set for N hardware threads with a conventional register set comprising N*R registers, where R is the number of registers used by a single thread. Within this register set, each thread owns the registers in index range [tid*R, . . . , (tid+1)*R[. If R is a power of two, the index mapping [0, . . . , R[→[tid*R, . . . , (tid+1)*R[ is a trivial merge operation of the wires carrying value tid with those of the register index in the least significant position. We use symbol ⊕ for the merge operator in FIG. 15, (e.g., merge operator 1506).

We may support the calling convention for passing function arguments from the caller and callee, and return values from the callee to the caller for forks, by reserving one register in each segment as frame pointer 1506. In this context, the frame pointer may point to a slot for both arguments and return values in the runtime stack of the forker, and is passed by the hardware from the forker to the forkee in case of a successful fork. In addition, we may speed up access to function arguments, by supporting a direct copy of reserved argument registers from the forker to the forkee segment in the register set. Registers A1 and A2 1504 and the associated datapaths illustrate hardware support for two argument registers in FIG. 15.

Analogous to providing private register sets for each hardware thread, we may provide hardware support for private runtime stacks to each hardware thread. Since the runtime stack may require significant storage capacity, we should allocate the runtime stack in memory. Although not entirely safe, we can support range checking for the stack pointer in hardware by introducing base and limit registers in thread table 800 in FIG. 8. The base value can also be used to initialize the stack pointer of a newly forked forkee thread in case of a successful fork.

Fork Degradation

The key structures for implementing fork degradation are: (1) thread table and scheduler 1304 in PC-stage 1302, (2) thread modules TREQ 1510 at the bottom of instruction decode (ID) stage 1512 in FIG. 15, TRES 1511 in the EX-stage, and TCOM 1516 in the ME-stage, and (3) link registers LR 1512 and LRE 1514. In the following we discuss each of these modules and their functionality in more depth. We describe the functionalities informally, and illustrate the interaction by discussing the traversal of a fork instruction through the processor pipeline.

Thread Table

As previously discussed thread table 1304 is responsible for maintaining the state of each of the hardware threads. In particular, thread table 1304 records the creation and termination of threads. A thread may be created by the fork instruction and terminated by the join instruction. Thread table 1304 receives fork and join requests (from modules TREQ 1510 and TCOM 1516). When thread scheduler 1304 receives a fork request, it scans the state fields of the individual threads in search of an 'unused' thread. If an unused thread exists, the fork request is successful, and the thread table responds with an unused thread identifier. Otherwise, if no unused thread exists, the thread table responds with a failure code.

When the thread table receives a join request, it is responsible for terminating or blocking the joining thread. As described previously with respect to FIG. 8, we use join table 812 and state and bid fields 802 and 806 of thread table 800 to record the relationship between forker and forkee threads. Upon receiving a join request, thread table/scheduler 1304 inspects the state and bid fields as well as the join table entry determined by the link register value. It blocks a joining thread by assigning 'blocked' to its state field and terminates a joining thread by assigning 'unused' to its state field. Also, it reactivates a blocked peer thread if the identifier of the joining thread matches the entry in the bid field.

Thread Modules

Next, we describe the functionalities of modules TREQ 1510, TRES 1511, and TCOM 1516. In principle, we wish to confine the interactions of the pipeline with the thread table to a single stage of the pipeline, because it simplifies the design by sequentialization. Since not all interactions can be executed within a single clock cycle without an unduly large clock period, we prefer to distribute complex interactions across multiple clock cycles. In our multithreaded pipeline, we split the fork instruction across three pipeline stages while the join instruction remains confined to ME-stage 1518.

TREQ module 1510 is located in ID-stage 1512, where it identifies fork instructions by opcode. Whenever a fork instruction appears, TREQ module 1510 signals a fork request to thread table 1304. We assume that the decoding, signaling, and recognition of the request by thread table 1304 fit into a single clock cycle.

During the clock cycle following a fork request, thread table 1304 responds with a fork success or fail signal. Also, in case of a successful fork, the signal is accompanied by a new forkee thread identifier. TRES module 1511 in EX-stage 1520 of the pipeline is responsible for receiving the response. If the instruction occupying EX-stage 1520 is a fork instruction, it forwards the reply from the thread table to TST portion 1522 of EX pipeline register 1524.

Yet one clock cycle later, the fork instruction occupies ME-stage 1518, where TCOM module 1516 is responsible for committing the fork. In case of a successful fork, it signals the thread table to activate the new forkee. Otherwise, in case of an unsuccessful fork no interaction with the thread table is required. For a successful fork, the TCOM module 1516 is also responsible for directing the composition of the link register triples, explained below. If a join instruction reaches ME-stage 1518, TCOM module 1516 signals a join request to the thread table, including forker and forkee thread identifiers. Since a join request requires updating of the thread table only, there is no need to spread the implementation of the join instruction across multiple clock cycles and pipeline stages.

Link Registers

We assume that each hardware thread reserves one of its registers in its associated register segment as a link register by convention. As described previously, we use the link register to pass the information from a fork instruction to the associated join instruction, in order to interpret the join depending on the success of the fork. The detour from the fork instruction through the link register, and via software spilling through the runtime stack back to the join instruction, provides the means to support a potentially unbounded number of software threads efficiently.

In case of a regular function call or an unsuccessful fork, only one link register is needed to store the link address, because the control flow remains within the context of the shepherding hardware thread. We use the regular link register (link register 1512) for this purpose. In FIG. 15, the link address is computed in the ID-stage by incrementing the program counter (add value 4 to NPC). The link address is passed through the LR-portion of ID, EX, and ME pipeline registers, 1512, 1520, and 1518 before it is written back into the register file.

In case of a successful fork, control flow splits into two threads. Thus, as discussed previously, we need to pass the fork information to both hardware threads the forker and the forkee. To that end, we introduce a second, architecturally-invisible link register LRE 1514 as portion of ME pipeline register, 1318. TCOM module 1516 is responsible for generating the link values for both forker and forkee threads. The thread identifier of the forker, which shepherds the fork instruction, is available in TID portion 1528 of EX pipeline register 1524, and the fork success bit and the forkee thread identifier are stored in TST portion 1522. TCOM module 1516 controls the assignment of the link triple for the forker thread to LR portion 1512 of the ME pipeline register, and that for the forkee thread to LRE portion 1514. During the write-back phase (WB-stage 1316), both link register values are stored in the link registers in the corresponding, distinct segments of the segmented register set.

Fork Walk-Through

In the following, we describe the traversal of a fork instruction through the processor pipeline. We assume that the thread scheduler selects an active hardware thread, whose program counter (PC) 1532 is issued to instruction fetch (IF) stage 1306, and instruction memory 1314 returns the fork instruction from that address. With the fork instruction in instruction register IR 1534, the instruction is decoded in ID-stage 1512, and operand values are fetched from the register set. Simultaneously, the TREQ module 1510 identifies fork instructions by opcode, and signals a fork request to the thread table.

One clock cycle later, when the fork instruction occupies EX-stage 1520, the thread table responds to TRES module 1511. If a hardware thread is available for shepherding the forked software thread, thread table 1304 reserves the forkee thread and responds with its thread identifier. Otherwise, if all threads are active, the response of thread table 1304 indicates that the fork is unsuccessful. TRES module 1511 relays the response of thread table 1304 to ME-stage 1518.

TCOM module 1516 commits the fork. If the fork request is successful, TCOM module 1516 signals the thread table to commit the reserved forkee thread, and initializes the link register values for the forker and forkee in LR and LRE portions 1512 and 1514 of ME pipeline register 1518. In case of an unsuccessful fork request, TCOM module 1516 effects the degradation of the fork instruction into a function call.

We place TCOM module 1516 in ME-stage 1518 of the pipeline, because this is the stage where the RISC pipeline commits an ordinary function call by feeding the address of the function entry point back to the program counter (PC) in thread table 1304. When the multithreaded processor executes a fork instruction, ALU 1536 computes the same program counter as for an ordinary function call. However, TCOM module 1516 directs the thread table to consume the program counter in one of two ways. In case of a successful fork, the program counter is stored in the PC field of the forkee thread. In contrast, if the fork fails, the program counter is stored in the PC field of the forker thread, which will subsequently jump to the function as would be the case with an ordinary function call.

Thread Scheduling

Our multithreaded processor design enables context switching amongst hardware threads during each clock cycle. During each clock cycle, the thread scheduler is responsible for selecting an active thread in the thread table, and supply its program counter to the instruction fetch stage. Unused and blocked threads are not eligible for execution. The thread scheduler is also responsible for guaranteeing fairness, so that all threads make progress eventually.

The datapath in FIG. 15 is a simple datapath without any interlocks and forwarding paths. This design relies on the thread scheduler to select each thread only as often as required to prevent data and control hazards. Alternatively, we could employ a more complex datapath with interlocks and forwarding. The former choice facilitates a simple, faster hardware design at the expense of allowing a single thread to be scheduled during every third or fourth clock cycle only. In contrast, the latter choice invests hardware complexity to improve the performance of single-threaded programs (James Laudon, Anoop Gupta, and Mark Horowitz. Architectural and Implementation Tradeoffs in the Design of Multiple-Context Processors. In Robert A. Iannucci, editor, *Multithreaded Computer Architecture: A Summary of the State of* the Art, pages 167-200. Kluwer Academic Publishers, Boston, Mass., 1994.) We may implement fork degradation for either of these choices.

Extensions to POWERPC Instruction Set

In a preferred embodiment of the present invention, fork degradation is accomplished through the addition of a number of extensions to the proposed POWERPC microprocessor architecture. As shown in Table 4, below, in a preferred embodiment, a number of additional registers are added to the POWERPC architecture to support the multithreading and thread degradation extensions. Among other things, these registers allow a thread to determine its ID and the ID of its parent thread.

TABLE 4

| Register Number | Access | Description |
| --- | --- | --- |
| 20 | Read-only | Returns the number of hardware threads (nThreads) supported by the current implementation |
| 21 | Read-only | Returns the ID of the current thread (0 . . . nThreads−1). There is an instance of this register per hardware thread. |
| 22 | Read-only | Returns the ID of the parent thread (0 . . . nThreads−1). There is an instance of this register per hardware thread. |
| 23 | Read/Write | Points to a memory buffer of size (nThreads*8). The buffer is implicitly treated as an array of initial stack pointers by the "fork" instruction. |

The "fork" operation, in this preferred embodiment, is implemented by adding two additional instructions to the POWERPC instruction set, "fork" and "forka." The "fork" and "forka" instructions are distinguished by the fact that the "fork" instruction forks/branches to an address that is relative to the address all of the "fork" instruction in itself, while the "forka" instruction forks/branches to an absolute address.

Figure 16A:
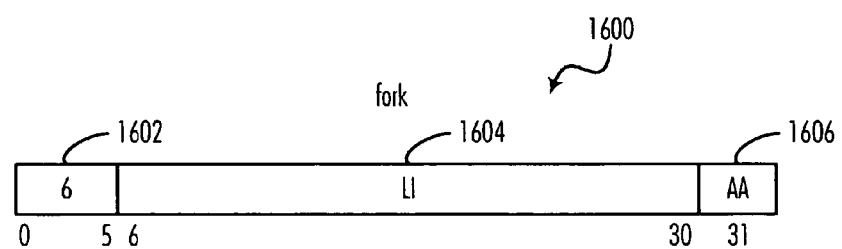
FIG. 16A is a diagram of the instruction format of "fork" and "forka" instructions in a POWERPC architecture extension to support fork degradation in a preferred embodiment of the present invention.

FIG. 16A is a diagram illustrating the instruction format of a "fork" or "forka" instruction in accordance with a preferred embodiment of the present invention. This exemplar embodiment is built upon a proposed POWERPC architecture having a 32-bit instruction format and a 64-bit link register. These particular bit lengths are for expository purposes only, however, and are not intended to be limiting. Other bit lengths and other architectural variations will be apparent to those skilled in the art and may be employed without departing from the scope and spirit of the present invention.

Turning now to the specifics of FIG. 16A, instruction 1600 is a 32-bit word comprising three fields, an opcode field 1602 (which indicates that the instruction is a "fork" or "forka" instruction), a link address (LI) field 1604 (which indicates the address to which the forkee/callee thread must branch), and an absolute/relative flag (AA) 1606. Absolute/relative flag 1606 is used to distinguish the "fork" instruction from the "forka" instruction. If absolute/relative flag 1606 is equal to zero, then the instruction is "fork," whereas if absolute/relative flag 1606 is equal to one, then the instruction is "forka."

Figure 16B:
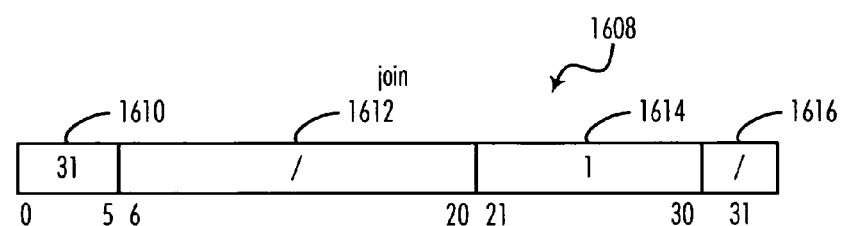
FIG. 16B is a diagram of the instruction format of a "join" instruction in a POWERPC architecture extension to support fork degradation in accordance with a preferred embodiment of the present invention.

FIG. 16B is a diagram illustrating the 32-bit instruction format for the proposed POWERPC "join" instruction in accordance with a preferred embodiment of the present invention. Instruction 1608 comprises four bit fields 1610, 1612, 1614, and 1616. Two of these fields, bit fields 1612 and 1616, are unused. Bit field 1610 is an opcode field, which, when combined with bit field 1614, indicates that the instruction is a "join" instruction. The operation of these two instructions is illustrated in FIGS. 17 and 18.

Figure 17:
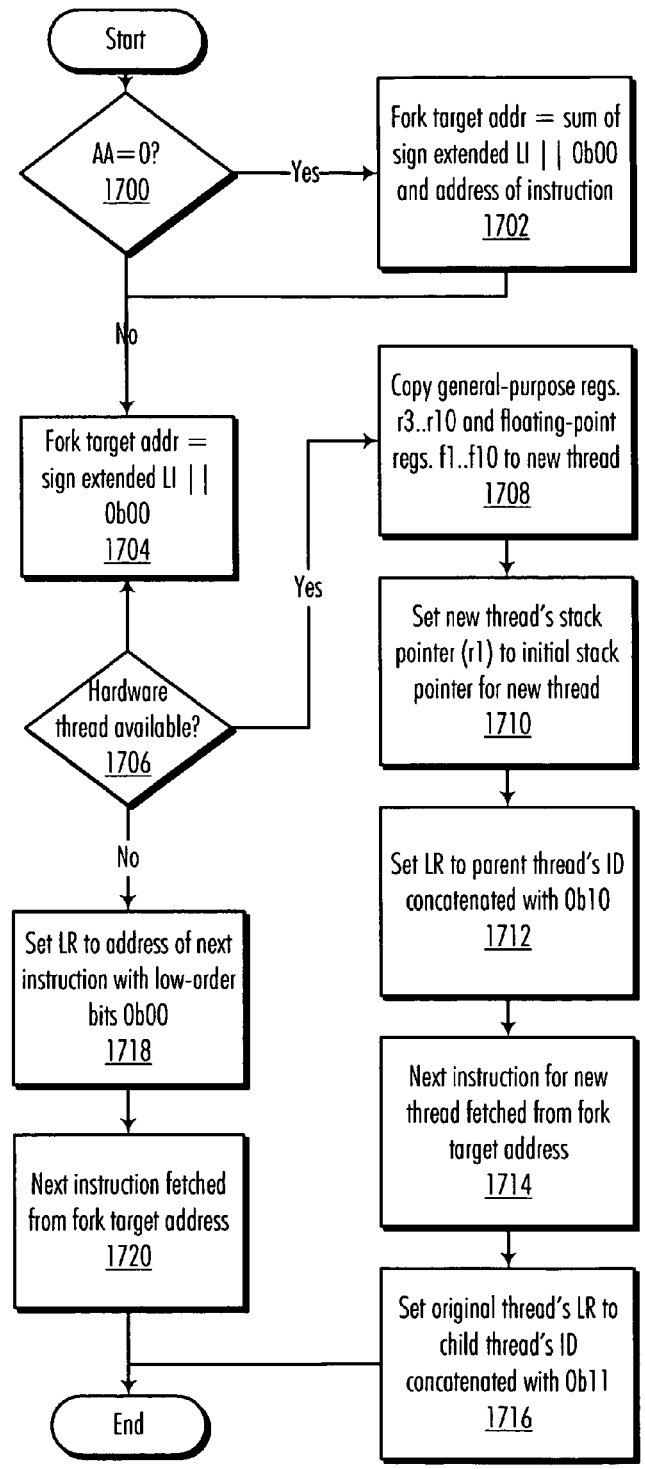
FIG. 17 is a flowchart representation of a process of executing a "fork" or "forka" instruction in a POWERPC architecture extension to support fork degradation in accordance with a preferred embodiment of the present invention.
Figure 18:
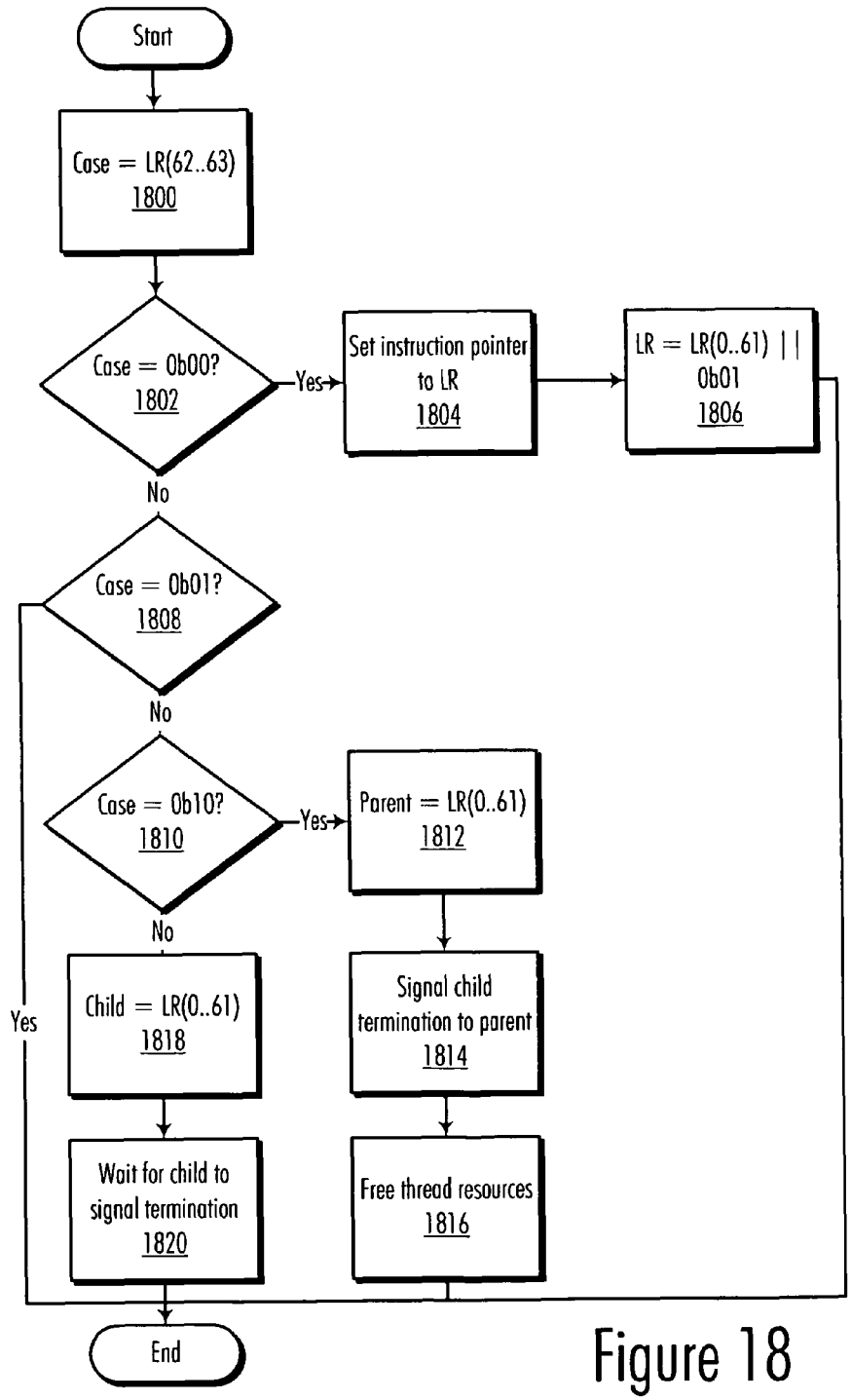
FIG. 18 is a flowchart representation of a process of executing a "join" instruction in a POWERPC architecture extension to support fork degradation in accordance with a preferred embodiment of the present invention.

FIG. 17 is a flowchart representation of a process of executing a "fork" or "forka" instruction in accordance with a preferred embodiment of the present invention. First, absolute/relative flag 1606 is checked to determine if the instruction is a "fork" instruction (block 1700). If so (block 1700: yes), then the target address of the fork is computed as the sum of the sign extended value of link address (LI) field 1604 concatenated with two binary zeros and the address of the "fork" instruction (block 1702). If, on the other hand, the instruction is a "forka" instruction (block 1700: no), then the fork target address is computed as simply the sign extended value of link address (LI) field 1604 concatenated with two binary zeros (block 1704).

Next, a determination is made as to whether a hardware thread is available to service the fork (block 1706). If so (block 1706: yes), general purpose registers r3, r4, . . . , r10 and floating-point registers f1, f2, . . . , f10 are copied into the new thread (block 1708). Next, the new thread's stack pointer (stored in register r1) is set to the initial stack pointer value for the new thread (block 1710). The link register (register lr) for the new thread is set to the parent thread's ID concatenated with the binary value 0b10 (block 1712). The next instruction (i.e., the first instruction to be executed by the new thread) is then fetched from the previously-computed fork target address (block 1714). Finally, the original thread's link register (i.e., the link register of the parent thread) is set to the child thread's ID concatenated with the binary value 0b11 (block 1716).

If, on the other hand, a hardware thread is not available and the instruction must be treated as a call rather than as a fork (block 1706: no), the link register is set to the address of the next instruction (i.e., the instruction immediately following the fork instruction), with the low-order bits of the link register being set to the binary value 0b00 (block 1718). The next instruction to be executed is then fetched from the previously-computed fork target address (block 1720).

FIG. 18 is a flowchart representation of a process of executing the proposed POWERPC "join" instruction in accordance with a preferred embodiment of the present invention. First, the two lowest-order bits of the link register are examined to determine the particular case in which the "join" instruction is being executed (block 1800). If the two low-order bits are both zeros, thus denoting a return from a fork that has degraded into a call (block 1802: yes), the instruction pointer (program counter) is then set to the value of the link register (block 1804). The lowest-order bit of the link register is then set to a binary one, so as to cause any subsequent "join" instruction to be treated as a nop (no operation) (block 1806).

If the two low-order bits of the link register are set to binary value 0b01 (block 1808: yes), corresponding to the situation where a "join" instruction is encountered in a caller subroutine after having returned from a fork that has degraded into a call, the "join" instruction is treated like as a nop (no operation).

If the two low-order bits of the link register are set to binary value 0b10 (block 1810: yes), corresponding to the situation where a forkee/child thread encounters a "join" instruction, the ID of the parent thread is determined from the upper 62 bits of the link register (block 1812). The termination of the child thread is then signaled to the parent thread (block 1814), and the resources of the child thread are freed (block 1816).

If the two low-order bits of the link register are set to binary value 0b11, corresponding to the situation where a forker/parent thread encounters a "join" instruction, the ID of the child thread is determined from the upper 62 bits of the link register (block 1818), and the parent thread waits for the child thread to signal its termination (block 1820).

One of the preferred implementations of the invention utilizes software, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an;" the same holds true for the use in the claims of definite articles.

What is claimed is:

1. A method comprising:
   providing a plurality of threads in a processor having a plurality of functional units and a thread scheduler for scheduling the plurality of threads;
   determining whether a particular thread in the plurality of threads has an instruction that is currently being processed by one of the plurality of functional units;
   in response to a determination that the particular thread has an instruction that is currently being processed by one of the plurality of functional units, blocking the particular thread from being scheduled for execution; and
   in response to a determination that the particular thread does not have an instruction that is currently being processed by one of the plurality of functional units, scheduling the particular thread for execution.

2. The method of claim 1, wherein the particular thread is blocked by recording a "blocked" designation in a thread table associated with the thread scheduler.

3. The method of claim 1, further comprising:
   determining whether the instruction has completed execution in the one of the plurality of functional units; and
   in response to a determination that the instruction has completed execution in the one of the plurality of functional units, recording a "commit" designation in a thread table associated with the thread scheduler.

4. The method of claim 3, further comprising:
   in response to the "commit" designation being recorded, reactivating the blocked particular thread.

5. The method of claim 4, further comprising:
   in response to the "commit" designation being recorded, scheduling the particular thread for execution to commit the instruction.

6. The method of claim 4, further comprising:
   in response to a determination that the instruction has completed execution in the one of the plurality of functional units, recording a result of the instruction in a result buffer.

7. The method of claim 6, further comprising:
   in response to rescheduling the particular thread for execution, retrieving the result of the instruction from the result buffer for further processing.

8. A processor comprising:
   a thread scheduler configured to schedule execution of instructions associated with a plurality of threads;
   a plurality of functional units configured to receive instructions scheduled for execution by the thread scheduler,
   wherein the thread scheduler schedules a current instruction for execution only if no previous instruction from a particular thread associated with the current instruction is currently being processed by a functional unit from the plurality of functional units.

9. The processor of claim 8, wherein the particular thread is blocked, in response to a determination that a previous instruction from the particular thread is currently being processed, by recording a "blocked" designation in a thread table associated with the thread scheduler.

10. The processor of claim 8, wherein, in response to a determination that the instruction has completed execution in the functional unit, the processor records a "commit" designation in a thread table associated with the thread scheduler.

11. The processor of claim 10, wherein the thread scheduler reactivates the blocked particular thread in response to the "commit" designation being recorded.

12. The processor of claim 11, wherein the thread scheduler in response to the "commit" designation being recorded, scheduling the particular thread for execution to commit the instruction.

13. The processor of claim 11, wherein the processor records a result of the instruction in a result buffer in response to a determination that the instruction has completed execution in the functional unit.

14. The processor of claim 8, wherein the processor retrieves the result of the instruction from the result buffer for further processing in response to rescheduling the particular thread for execution.

15. A processor comprising:

means for providing a plurality of threads in a processor having a plurality of functional units and a thread scheduler for scheduling the plurality of threads;

means for determining whether a particular thread in the plurality of threads has an instruction that is currently being processed by one of the plurality of functional units;

means, responsive to a determination that the particular thread has an instruction that is currently being processed by one of the plurality of functional units, for blocking the particular thread from being scheduled for execution; and means, responsive to a determination that the particular thread does not have an instruction that is currently being processed by one of the plurality of functional units, for scheduling the particular thread for execution.

16. The processor of claim 15, wherein the particular thread is blocked by recording a "blocked" designation in a thread table associated with the thread scheduler.

17. The processor of claim 15, further comprising:

means for determining whether the instruction has completed execution in the one of the plurality of functional units; and means, responsive to a determination that the instruction has completed execution in the one of the plurality of functional units, for recording a "commit" designation in a thread table associated with the thread scheduler.

18. The processor of claim 17, further comprising:

means, responsive to the "commit" designation being recorded, for reactivating the blocked particular thread.

19. The processor of claim 18, further comprising:

means, responsive to the "commit" designation being recorded, for scheduling the particular thread for execution to commit the instruction.

20. The processor of claim 18, further comprising:

means, responsive to a determination that the instruction has completed execution in the one of the plurality of functional units, for recording a result of the instruction in a result buffer.

21. A processor comprising:

a thread scheduler configured to schedule execution of instructions associated with a plurality of threads; and a plurality of functional units configured to receive instructions scheduled for execution by the thread scheduler, wherein the processor determines whether a current instruction in a particular thread is a member of a pre-determined subset of an instruction set for the processor, and wherein the processor, in response to a determination that the current instruction is a member of the pre-determined subset, causes the thread scheduler to block the particular thread from being scheduled for execution pending completed execution of the current instruction in one of the plurality of functional units.

22. The processor of claim 21, wherein the pre-determined subset of the instruction set includes floating-point instructions.

23. The processor of claim 21, wherein the pre-determined subset of the instruction set includes instructions that, when executed in one of the plurality of functional units, has a latency that exceeds a pre-determined duration.

24. The processor of claim 21, wherein the pre-determined subset of the instruction set includes instructions for which multiple, replicated functional units are provided.

* * * * *